US010106394B2

(12) United States Patent
Rege et al.

(10) Patent No.: US 10,106,394 B2
(45) Date of Patent: Oct. 23, 2018

(54) METHOD OF REGULATING PRESSURE IN PRESSURIZED BEVERAGE DISPENSER

(71) Applicant: GrowlerWerks, INC., Portland, OR (US)

(72) Inventors: Evan Christopher Rege, Portland, OR (US); Donald Christian Maier, Camas, WA (US); Shawn Leland Huff, Portland, OR (US); Brian Edwards Sonnichsen, Portland, OR (US)

(73) Assignee: GrowlerWerks, Inc., Portland, OR (US)

( * ) Notice: Subject to any disclaimer, the term of this patent is extended or adjusted under 35 U.S.C. 154(b) by 0 days.

(21) Appl. No.: 15/149,437

(22) Filed: May 9, 2016

(65) Prior Publication Data

US 2016/0251212 A1    Sep. 1, 2016

Related U.S. Application Data

(62) Division of application No. 14/720,356, filed on May 22, 2015, now Pat. No. 9,352,949.

(Continued)

(51) Int. Cl.
*B67D 1/12* (2006.01)
*B67D 1/04* (2006.01)
(Continued)

(52) U.S. Cl.
CPC ............. *B67D 1/1252* (2013.01); *B67D 1/00* (2013.01); *B67D 1/0004* (2013.01); *B67D 1/04* (2013.01);
(Continued)

(58) Field of Classification Search
CPC .. B67D 1/1252; B67D 1/0075; B67D 1/0076; B67D 1/0406; B67D 1/0412;
(Continued)

(56) References Cited

U.S. PATENT DOCUMENTS

| 663,132 A | 12/1900 | Coughlin |
| 1,015,987 A | 1/1912 | Bijur et al. |

(Continued)

FOREIGN PATENT DOCUMENTS

| AU | 2011101499 A4 | 12/2011 |
| EP | 0149352 B1 | 7/1985 |

(Continued)

OTHER PUBLICATIONS

Mociak, U.S. Appl. No. 61/782,050, filed Mar. 14, 2013, 11 pages.

(Continued)

*Primary Examiner* — Patrick M Buechner
(74) *Attorney, Agent, or Firm* — Miller Nash Graham & Dunn LLP; Kevin S. Ross

(57) ABSTRACT

A beverage dispenser with a variable pressure regulator cap assembly that includes a high pressure cavity defined by a cap body. The high pressure cavity receives pressurized gas from a compressed gas reservoir. A low pressure cavity is connected to the high pressure cavity via a high pressure gas passageway. The low pressure cavity defines a low pressure gas passageway that penetrates the cap body. A piston seat is positioned on a high pressure cavity side of the high pressure gas passageway. A piston regulates introduction of the pressurized gas into the high pressure gas passageway. A diaphragm is positioned between an ambient pressure cavity and the low pressure cavity and translates the piston relative to the piston seat. A main spring is positioned between a diaphragm and a spring hat. Rotation of the drive screw translates the spring hat to affect compression of the main spring against the diaphragm.

6 Claims, 11 Drawing Sheets

Related U.S. Application Data

(60) Provisional application No. 62/146,858, filed on Apr. 13, 2015, provisional application No. 62/085,228, filed on Nov. 26, 2014, provisional application No. 62/047,594, filed on Sep. 8, 2014, provisional application No. 62/002,824, filed on May 24, 2014.

(51) Int. Cl.
   *B67D 1/00* (2006.01)
   *G05D 16/06* (2006.01)
   *B67D 1/08* (2006.01)
   *B67D 1/14* (2006.01)

(52) U.S. Cl.
   CPC ......... *B67D 1/0406* (2013.01); *B67D 1/0418* (2013.01); *B67D 1/08* (2013.01); *B67D 1/0808* (2013.01); *B67D 1/12* (2013.01); *B67D 1/1222* (2013.01); *B67D 1/1438* (2013.01); *B67D 1/1477* (2013.01); *G05D 16/0661* (2013.01); *B67D 1/0801* (2013.01); *B67D 1/0871* (2013.01); *B67D 1/125* (2013.01); *B67D 1/1247* (2013.01); *B67D 1/1466* (2013.01); *B67D 2001/0481* (2013.01); *B67D 2001/0487* (2013.01); *B67D 2001/0812* (2013.01); *B67D 2001/0822* (2013.01)

(58) Field of Classification Search
   CPC .... B67D 1/0418; G05D 16/10; G05D 16/106; G05D 16/103
   See application file for complete search history.

(56) References Cited

U.S. PATENT DOCUMENTS

| | | |
|---|---|---|
| 1,079,771 A | 11/1913 | Kiefer |
| 2,072,816 A | 3/1937 | Hill, Jr. |
| 2,092,174 A | 9/1937 | Lithgow |
| 2,092,596 A | 9/1937 | Ward |
| 2,100,990 A | 11/1937 | Valentine |
| 2,170,531 A | 8/1939 | Kahn |
| 2,330,774 A | 9/1943 | Alexander |
| 2,539,929 A | 1/1951 | Roberts |
| 2,593,770 A | 4/1952 | Kollsman |
| 2,741,319 A | 4/1956 | Mickelsen |
| 2,774,229 A | 12/1956 | Thau et al. |
| 2,794,452 A | 6/1957 | Quam |
| 2,847,856 A | 8/1958 | Mahon |
| 2,917,906 A | 12/1959 | Woolley |
| 3,000,525 A | 9/1961 | Leslie-Smith |
| 3,006,515 A | 10/1961 | Midnight |
| 3,082,895 A | 3/1963 | Leslie-Smith |
| 3,089,603 A | 5/1963 | Leslie-Smith |
| 3,115,263 A | 12/1963 | Leslie-Smith |
| 3,158,277 A | 11/1964 | Luertzing |
| 3,159,176 A | 12/1964 | Russell et al. |
| 3,211,175 A * | 10/1965 | Replogle ................ A62B 9/02 137/493 |
| 3,228,559 A * | 1/1966 | Couffer ................ B67D 1/0412 222/399 |
| 3,243,085 A | 3/1966 | Wilson |
| 3,319,829 A * | 5/1967 | Sentz ...................... F17C 13/04 222/189.06 |
| 3,347,417 A | 10/1967 | Puster |
| 3,352,456 A | 11/1967 | Swineford |
| 3,403,820 A | 10/1968 | Landis et al. |
| 3,411,669 A | 11/1968 | Puster |
| 3,508,569 A | 4/1970 | Puster |
| 3,604,452 A * | 9/1971 | Daniels .................. F16K 15/18 137/523 |
| 3,658,082 A * | 4/1972 | DiTirro .................. G05D 16/10 137/116.5 |
| 3,679,104 A | 7/1972 | Giroud |
| 3,809,275 A | 5/1974 | Ek |
| 3,956,934 A | 5/1976 | White |
| 4,011,971 A * | 3/1977 | Haydon ............... B67D 1/0412 222/399 |
| 4,121,730 A | 10/1978 | Dammer |
| 4,418,848 A | 12/1983 | Lunau |
| 4,456,155 A * | 6/1984 | Miyata ................. B65D 83/663 222/396 |
| 4,526,730 A | 7/1985 | Cochran et al. |
| 4,669,639 A | 6/1987 | Klarenbach et al. |
| 4,735,348 A | 4/1988 | Santoiemmo et al. |
| 4,940,212 A | 7/1990 | Burton |
| 4,984,717 A | 1/1991 | Burton |
| 4,997,111 A | 3/1991 | Lowers |
| 5,022,565 A | 6/1991 | Sturman et al. |
| 5,031,799 A | 7/1991 | Owen |
| 5,110,012 A | 5/1992 | Scholle et al. |
| 5,115,942 A | 5/1992 | Merrill et al. |
| 5,118,009 A | 6/1992 | Novitsky |
| 5,165,569 A | 11/1992 | Furuhashi et al. |
| 5,178,799 A | 1/1993 | Brown et al. |
| 5,199,609 A | 4/1993 | Ash, Jr. |
| 5,240,144 A | 8/1993 | Feldman |
| 5,282,561 A | 2/1994 | Mihalich |
| 5,329,975 A | 7/1994 | Heitel |
| 5,395,012 A | 3/1995 | Grill et al. |
| 5,443,186 A | 8/1995 | Grill |
| 5,568,882 A | 10/1996 | Takacs |
| 5,598,869 A | 2/1997 | Nelson |
| 5,635,232 A | 6/1997 | Wallace |
| 5,775,526 A | 7/1998 | Overy |
| 5,836,364 A | 11/1998 | Burton |
| 5,918,761 A | 7/1999 | Wissinger |
| 5,979,713 A | 11/1999 | Grill |
| 6,036,054 A | 3/2000 | Grill |
| 6,073,811 A | 6/2000 | Costea |
| 6,196,418 B1 | 3/2001 | McCann et al. |
| 6,360,923 B1 | 3/2002 | Vlooswijk |
| 6,651,852 B2 | 11/2003 | Arellano |
| 6,702,138 B1 | 3/2004 | Bielecki et al. |
| 6,823,651 B2 | 11/2004 | Thierjung et al. |
| 6,857,315 B1 | 2/2005 | Mills et al. |
| 7,131,560 B2 | 11/2006 | Hammond |
| 7,287,670 B2 | 10/2007 | Yoshida et al. |
| 7,757,908 B1 | 7/2010 | Buhl, Jr. |
| 7,954,666 B2 | 6/2011 | Webster et al. |
| 8,070,023 B2 | 12/2011 | Vitantonio et al. |
| 8,177,103 B2 | 5/2012 | Pakkert et al. |
| 8,191,740 B2 | 6/2012 | Hoss et al. |
| 8,387,826 B2 | 3/2013 | Tsubouchi et al. |
| 8,444,011 B2 | 5/2013 | Paauwe et al. |
| 8,544,701 B1 | 10/2013 | Scott |
| 8,887,959 B2 | 11/2014 | Hill et al. |
| 8,906,438 B2 | 12/2014 | Landman |
| 9,028,898 B2 | 5/2015 | Wallace |
| 9,114,911 B2 | 8/2015 | Laib et al. |
| 9,156,670 B2 | 10/2015 | Hill et al. |
| 9,611,131 B2 | 4/2017 | Lehman |
| 2003/0000971 A1 | 1/2003 | Nielsen |
| 2004/0099312 A1 | 5/2004 | Boyer |
| 2005/0051476 A1 | 3/2005 | Chen et al. |
| 2005/0211712 A1 | 9/2005 | Moran |
| 2006/0043109 A1 | 3/2006 | Masuda |
| 2006/0086136 A1 | 4/2006 | Maritan et al. |
| 2006/0144865 A1 | 7/2006 | Yoshida et al. |
| 2006/0243752 A1 | 11/2006 | Pakkert et al. |
| 2007/0181601 A1 | 8/2007 | Daly |
| 2008/0047922 A1 | 2/2008 | Olson et al. |
| 2008/0142421 A1 | 6/2008 | Windmiller |
| 2009/0071548 A1* | 3/2009 | Patterson ........... G05D 16/0602 137/497 |
| 2009/0090741 A1 | 4/2009 | Oberhofer et al. |
| 2009/0140006 A1 | 6/2009 | Vitantonio et al. |
| 2009/0211202 A1 | 8/2009 | Lemme |
| 2009/0242044 A1* | 10/2009 | Kranz ..................... B67D 1/12 137/505.36 |
| 2009/0301990 A1 | 12/2009 | Cresswell et al. |
| 2009/0302069 A1 | 12/2009 | Oberhofer et al. |
| 2009/0308898 A1 | 12/2009 | Polano et al. |
| 2010/0024660 A1 | 2/2010 | Wallace |

(56) References Cited

U.S. PATENT DOCUMENTS

| | | |
|---|---|---|
| 2010/0028515 A1 | 2/2010 | Gormley |
| 2011/0036451 A1 | 2/2011 | Maas et al. |
| 2011/0049182 A1 | 3/2011 | Smith et al. |
| 2011/0151085 A1 | 6/2011 | Wallace |
| 2011/0204093 A1 | 8/2011 | Lee |
| 2012/0199682 A1 | 8/2012 | Lee et al. |
| 2012/0305109 A1 | 12/2012 | Peirsman et al. |
| 2013/0032564 A1 | 2/2013 | Rosbach |
| 2013/0074978 A1 | 3/2013 | Rasmussen et al. |
| 2013/0175304 A1 | 7/2013 | Peirsman et al. |
| 2013/0319969 A1 | 12/2013 | Snead |
| 2014/0231442 A1 | 8/2014 | Hill et al. |
| 2014/0262899 A1 | 9/2014 | Mociak |
| 2015/0329344 A1 | 11/2015 | Taradalsky et al. |
| 2017/0174495 A1 | 6/2017 | McIntyre et al. |
| 2017/0240405 A1 | 8/2017 | Gibson et al. |

FOREIGN PATENT DOCUMENTS

| | | |
|---|---|---|
| EP | 2336078 A1 | 6/2011 |
| WO | 2008066376 A1 | 6/2008 |

OTHER PUBLICATIONS

"Innovation" Growler Werks [online], Sep. 17, 2015. Retrieved on Nov. 14, 2015. Retrieved from the Internet. <https://web.archive.org/web/20150917091038/http://www.growlerwerks.com/pages/innovation>.

International Search Report and the Written Opinion, dated Jan. 21, 2016, 17 pages, International Application No. PCT/US15/49005, Alexandria, Virginia.

International Search Report and Written Opinion for International Application No. PCT/US2015/032283, dated Aug. 21, 2015, 13 pages.

Extended European Search Report issued in European Patent Application No. 15800481.2, dated Dec. 12, 2017.

Supplementary Partial European Search Report and Provisional Opinion issued in European Patent Application No. 15839867.7, dated May 3, 2018, 13 pages.

Corrected Extended European Search Report issued in European Patent Application No. 15800481.2, dated Jul. 26, 2018, 11 pages.

Extended European Search Report issued in European Patent Application No. 15839867.7, dated Aug. 6, 2018, 11 pages.

* cited by examiner

METHOD OF REGULATING PRESSURE IN PRESSURIZED BEVERAGE DISPENSER

RELATED APPLICATIONS

This patent application claims priority to and is a division of co-pending U.S. Non-Provisional application Ser. No. 14/720,356, entitled BEVERAGE DISPENSER AND VARIABLE PRESSURE REGULATOR CAP ASSEMBLY, filed May 22, 2015, which in turn claims benefit from U.S. Provisional Application No. 62/002,824 filed May 24, 2014; 62/047,594 filed Sep. 8, 2014; 62/085,228 filed Nov. 26, 2014; and 62/146,858 filed Apr. 13, 2015. The foregoing applications are incorporated herein by reference in their entireties.

FIELD

The embodiments described herein are related to beverage dispensers. In particular, some embodiments described in this disclosure relate to variable pressure regulator cap assemblies implemented with beverage dispensers.

BACKGROUND

A beverage such as beer, hard cider, and some wines may contain dissolved carbon dioxide and/or other gases. The dissolved gas gives the beverage a carbonated or bubbly quality. The dissolved gas may come out of solution, making the beverage flat. In particular, when exposed to atmospheric pressure, the beverage may become flat. When the beverage becomes flat, consumers are less likely to consume the beverage.

Additionally, a flavor of the beverage may benefit from limiting or eliminating exposure of the beverage to oxygen. Oxygen may cause oxygenation processes to occur in the beverage, which may alter the flavor of the beverage and/or cause the beverage to become stale or spoil. For example, craft beer, which may have a rich flavor when produced, may adopt a cardboard-like flavor when exposed to oxygen.

The subject matter claimed herein is not limited to embodiments that solve any disadvantages or that operate only in environments such as those described above. Rather, this background is only provided to illustrate one example technology area where some embodiments described herein may be practiced.

SUMMARY

An example embodiment includes a beverage dispenser. The beverage dispenser includes a vessel that defines an internal volume and a regulator cap assembly. The regulator cap assembly is configured to be received by the vessel. The regulator cap assembly includes a cap body, a gas reservoir sleeve, a high pressure cavity, a piston, a low pressure cavity, and a dial. The gas reservoir sleeve is configured to at least partially receive a compressed gas reservoir. The gas reservoir sleeve includes a first end that defines a connection that is configured to mechanically attach to a cap body sleeve connection, a second end opposite the first end, and a sleeve body between the first end and the second end that extends from the cap body in a first direction when the gas reservoir sleeve is mechanically attached to the cap body sleeve connection. The first direction is oriented such that when the regulator cap assembly is received in the vessel, the gas reservoir sleeve is at least partially positioned within the internal volume. The high pressure cavity is at least partially defined by the cap body and is configured to receive pressurized gas from the compressed gas reservoir. The piston is at least partially positioned in the high pressure cavity. The low pressure cavity is at least partially defined by the cap body. The low pressure cavity defines a low pressure cavity passageway that penetrates the cap body to fluidly couple the low pressure cavity and the internal volume when the regulator cap assembly is received in the vessel. A rotational position of the dial determines a magnitude of a force that acts against the piston to regulate a transfer of the pressurized gas from the high pressure cavity to the low pressure cavity.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION OF SOME EXAMPLE EMBODIMENTS

Some embodiments described herein are related to a beverage dispenser (dispenser). More particularly, some embodiments relate to a portable dispenser configured to preserve quality of a beverage or fluid stored in the dispenser by applying a pressure to the beverage and limiting oxygen exposure.

An example dispenser includes a vacuum insulated vessel and a regulator cap assembly. The regulator cap assembly seals the vessel and applies a gas pressure to a beverage in an internal volume defined by the vessel. The pressurized gas provides sufficient pressure to pressurize and dispense the beverage.

These and other embodiments combine a variable pressure regulator with a gas reservoir that seals a vessel from the outside environment, which limits oxygen introduction into the vessel. The seal allows for a controlled pressure environment to exist inside the vessel. Furthermore, the regulator cap assembly mounts the compressed gas reservoir and conceals it from the user within the gas reservoir sleeve and within the vessel when the regulator cap assembly is received by the vessel.

The regulator cap assembly includes a user-selectable variable pressure regulator, which allows a user to safely vary the pressure in the vessel. The regulator cap assembly includes a cap that houses a supply of high pressure gas. The gas may be stored in a standard high pressure gas reservoir such as a common 8-gram, 16-gram, or 33-gram CO2 cartridge.

The cap assembly may be configured for use on different dispensers or vessels. For example, the size, shape, and threaded interface region of vessels may vary. The cap assembly may be sized to fit the size, shape, and threaded interface region of one or more vessels and provides the substantially similar functionality. Moreover, the cap assembly may be modified to accommodate and integrate with different vessels. Users may accordingly select from a variety of dispensers with different brands, looks, feels, beverage volumes, external features, external devices, while the functionality of the cap assembly remains substantially similar.

Some additional details of these and other embodiments are discussed with respect to the appended figures in which commonly labeled items indicate similar structure unless described otherwise. The drawings are diagrammatic and schematic representations of some embodiments, and are not meant to be limiting, nor are they necessarily drawn to scale. Throughout the drawings, like numbers generally reference like structures unless described otherwise.

Figure 1A:
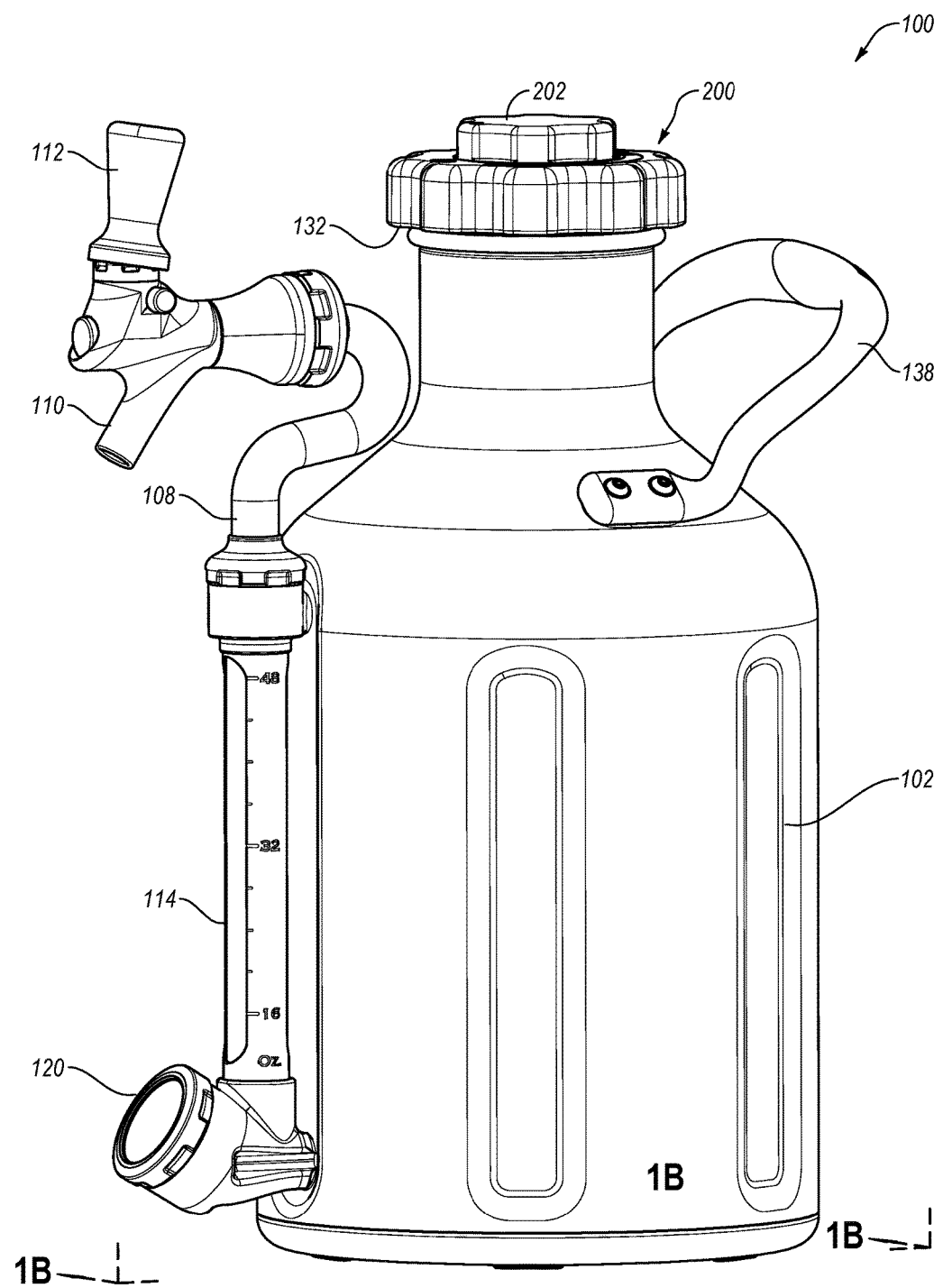
FIG. 1A illustrates an example beverage dispenser.
Figure 1B:
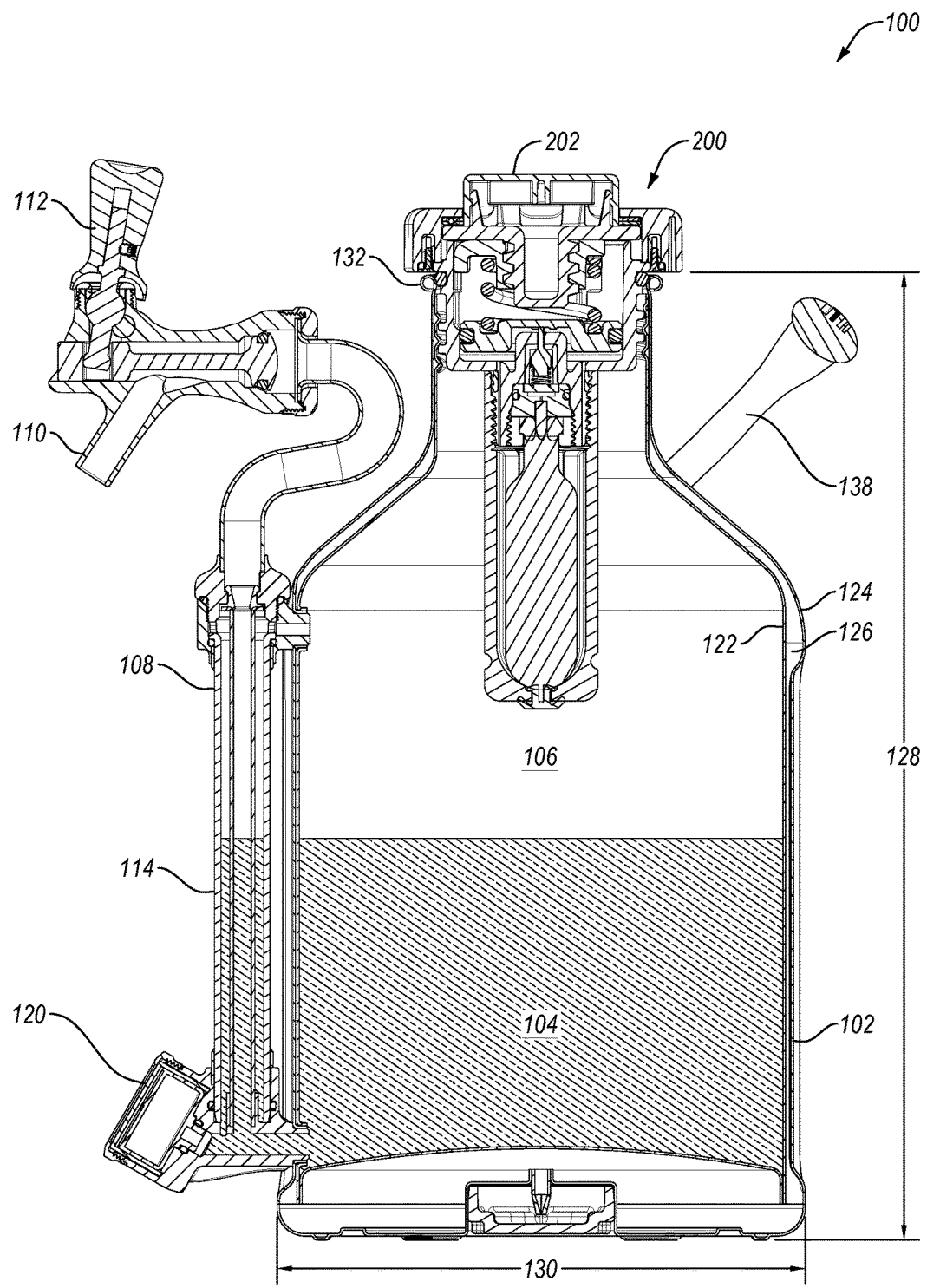
FIG. 1B illustrates another view of the beverage dispenser of FIG. 1A.
Figure 1C:
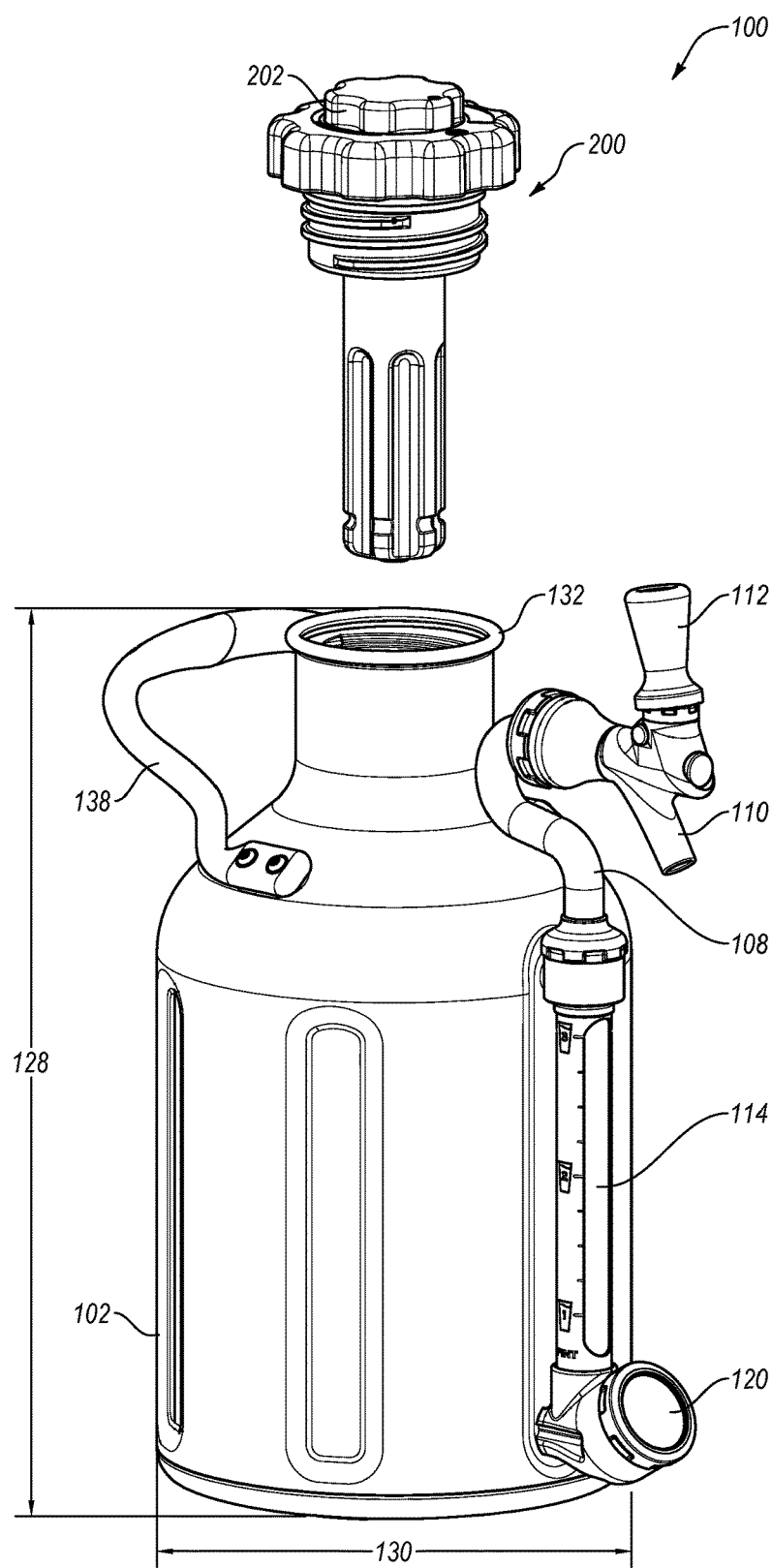
FIG. 1C illustrates another view of the beverage dispenser of FIGS. 1A and 1B.

FIGS. 1A-1C illustrate an example beverage dispenser 100. FIG. 1A depicts an exterior perspective view of the dispenser 100. FIG. 1B depicts a sectional view of the dispenser 100. FIG. 1C depicts a partially exploded view of the dispenser 100. Generally, the dispenser 100 is a portable beverage dispenser that may be used to store, preserve, transport, and dispense a beverage 104, (FIG. 1B only), retained in an internal volume 106 defined by a vessel 102. The vessel 102 is configured to receive a regulator cap assembly 200. The regulator cap assembly 200 is configured to at least partially seal a mouth 132 of the vessel 102 and to regulate a pressure applied to the beverage 104. In particular, the regulator cap assembly 200 may apply a pressure to the beverage 104 that is selectable and adjustable based at least partially on a rotational position of a dial 202.

The pressure applied to the beverage 104 by the regulator cap assembly 200 may preserve a freshness of the beverage 104 by reducing interaction between the beverage 104 and atmospheric air or oxygen. Additionally, the pressure applied to the beverage 104 may increase a period in which the beverage 104 maintains a gaseous solution (e.g., carbonation or nitrogenation) and/or may force a portion of a gas into solution (e.g., carbonize) in the beverage 104. Additionally still, the pressure applied to the beverage 104 may also be used to dispense the beverage 104 from the dispenser 100.

The vessel 102 of FIGS. 1A-1C may include a double-wall vacuum vessel having a double-wall construction as best illustrated in FIG. 1B. The double-wall construction may form a vacuum space 126 between an interior wall 122 and an exterior wall 124 of the vessel 102. The vacuum space 126 may insulate the beverage 104 in the internal volume 106 defined by the vessel 102 from an environment surrounding the dispenser 100. The vessel 102 can be constructed of a metal or metal alloy that may comprise, for example, a stainless steel or an aluminum. The internal volume 106 of the vessel 102 may be defined to include multiple volumes and multiple shapes. For example, the internal volume 106 may be about sixty-four volumetric ounces (oz.), 32 oz., 128 oz., 1 liter (L), 2 L, 10 L, for instance.

With reference to FIGS. 1B and 1C, the vessel 102 may include a vessel height 128 of between about 150 millimeters (mm) and about 460 mm and a vessel diameter 130 between about 100 mm and about 460 mm. The vacuum space 126 or a total thickness defined to include the interior wall 122 and the exterior wall 124 of the vessel 102 may be between 1.5 mm and about 51 mm. The thickness of the interior wall 122 and/or the exterior wall 124 may be between about 0.8 mm and about 3.1 mm. For example, the example vessel 102 shown in FIGS. 1A-1C includes a vessel height 128 of about 250 mm and vessel diameter 130 of about 125 mm.

Referring to FIGS. 1A-1C, in the vessel 102 a first portion of a threaded connection may be defined at the mouth 132 of the vessel 102. The regulator cap assembly 200 may include a second, complementary portion of the threaded connection. Accordingly, the regulator cap assembly 200 may be received by the vessel 102 by rotating the regulator cap assembly 200 relative to the vessel 102 to couple the regulator cap assembly 200 with the vessel 102. When received by the vessel 102, the regulator cap assembly 200 may apply the pressure to the beverage 104.

As mentioned above, the pressure applied to the beverage 104 may be used to dispense the beverage 104 from the dispenser 100. For example, the pressure applied to the beverage 104 may be greater than a pressure in the environment surrounding the dispenser 100. The pressure may force the beverage 104 into a dispensing tube 108 that transports the beverage 104 from the internal volume 106 of the vessel 102 to a dispensing tap 110. When a tap handle 112 of the dispensing tap 110 is actuated, the dispensing tube 108 may be open to the pressure of the environment, and the beverage 104 may flow in a positive y-direction in the arbitrarily assigned coordinate system of FIGS. 1A-1C. The beverage 104 may then exit the dispensing tube 108 via the dispensing tap 110.

In the embodiment depicted in FIGS. 1A-1C, the dispenser 100 may include a vessel level indicator 114. The vessel level indicator 114 may show a level of the beverage 104 in the dispensing tube 108, which may correlate to a volume of the beverage 104 in the internal volume 106 of the vessel 102. In some embodiments, the vessel level indicator 114 may be substantially similar to one or more embodiments discussed in U.S. Provisional Application No. 62/047, 594, which is incorporated herein by reference in its entirety.

Additionally, dispenser 100 of FIGS. 1A-1C includes a pressure gauge 120. The pressure gauge 120 may indicate a pressure in the internal volume 106 of the vessel 102. The pressure indicated by the pressure gauge 120 may correspond to the pressure applied by the regulator cap assembly 200. In the depicted embodiment, the pressure gauge 120 is in fluid communication with the dispensing tube 108. In some embodiments, the pressure gauge 120 may be positioned on the vessel 102 or the regulator cap assembly 200 or may be omitted from the dispenser 100, for instance.

The dispenser 100 may include a temperature gauge (not shown). The temperature gauge may indicate a temperature of the beverage 104 in the internal volume 106 of the vessel 102. The temperature gauge may be in fluid communication with the dispensing tube 108, similar to the pressure gauge 120 in FIGS. 1A-1C. Alternatively, the temperature gauge may be incorporated in the pressure gauge 120 (e.g., one gauge that indicates pressure and temperature), fit to the vessel 102, fit to the regulator cap assembly 200, or omitted.

The temperature and/or pressure of the beverage 104 may be important factors to the quality of the beverage 104. The user can monitor the pressure and the temperature of the beverage 104 using the pressure gauge 120 and/or the temperature gauge. For example, the user may be particularly interested in the pressure after an initial rotation of the dial 202 (as described elsewhere in this disclosure). The pressure gauge 120 provides feedback to the user that can be used in conjunction with the dial 202 to accurately set a desired pressure applied to the beverage 104. The pressure gauge 120 can also be useful for monitoring the pressure of the vessel 102 when the dispenser 100 is not refrigerated and the temperature of the beverage 104 accordingly increases. The user may not want contents to become over-pressurized as a result of increased temperature and may choose to vent some or all of the pressure to maintain the pressure of the beverage 104 within a specific range, or below a specific maximum level.

Additionally, the temperature gauge provides the user temperature information for preserving and maintaining the quality of the beverage 104. For example, beer has a more desirable flavor when served at medium to cold liquid temperatures. An example preferred range may be between about 35 and about 45 degrees Fahrenheit.

The dispenser 100 of FIGS. 1A-1C may include a handle 138. The handle 138 can be mechanically attached to the vessel 102. The handle 138 may be mechanically coupled to the vessel 102 via fasteners as shown in FIGS. 1A-1C or via band straps (not shown) that grip around the vessel 102. The handle 138 is configured to assist in pouring the beverage from the vessel 102 and carrying the vessel 102. The handle 138 may be rigid and generally extend from the vessel 102 in a positive y-direction as shown in FIGS. 1A-1C. Alternatively, the handle 138 may be attached via pivot points that allow the handle 138 to swing up or down as needed by the user.

In the embodiment of FIGS. 1A-1C, the vessel 102 includes the dispensing tube 108, the tap handle 112, and the dispensing tap 110. In some embodiments, the dispenser 100 may not include one or more of the dispensing tube 108, the tap handle 112, and the dispensing tap 110. Additionally, one or more of the dispensing tube 108, the tap handle 112, and the dispensing tap 110 may be located in the internal volume 106. In these embodiments as well as that depicted in FIGS. 1A-1C, the beverage 104 may be dispensed by reducing the pressure applied to the vessel 102, removing the regulator cap assembly 200, and pouring the beverage 104 from the mouth 132 of the vessel 102. The regulator cap assembly 200 can be replaced onto the vessel 102 and the user can turn the dial 202 to the desired position, causing the regulator cap assembly 200 to pressurize the remaining contents of the vessel 102.

Additionally, in some embodiments, the vessel 102 may include one or more of the dispensing tube 108, the tap handle 112, and the dispensing tap 110 without the vessel level indicator 114. Alternatively, the vessel level indicator 114 may be built directly into the vessel 102. In these and other embodiments, a portion of the dispensing tube 108 may be positioned in the internal volume 106 and the dispensing tap 110 and tap handle 112 may be external to the vessel 102.

The dispensing tap 110 may be configured to be operated by using one hand, which may allow the user to hold a glass to receive the beverage 104 in their other hand. The dispensing tap 110 may also be oriented on the vessel 102 to allow the user to place the glass under the dispensing tap 110 at an angle less than about 90 degrees, which may minimize the formation of excessive foam. The user opens and closes the dispensing tap 110 by pulling the tap handle 112 forward (in a negative x-direction in FIG. 1B) and closes the dispensing tap 110 by pushing the tap handle 112 back to its starting closed position. The tap handle 112 may also include a safety locking mechanism to prevent the tap handle 112 from moving to the open position accidentally.

The tap handle 112 may be attached to the dispensing tap 110 by a specialized tap handle fastener. The tap handle 112 is removable and may be replaced by customized designs of various shapes, colors, sizes, etc. Customizing the tap handle 112 provides a distinct level of personalization for the user or a supplier using the dispenser 100.

Figure 2:
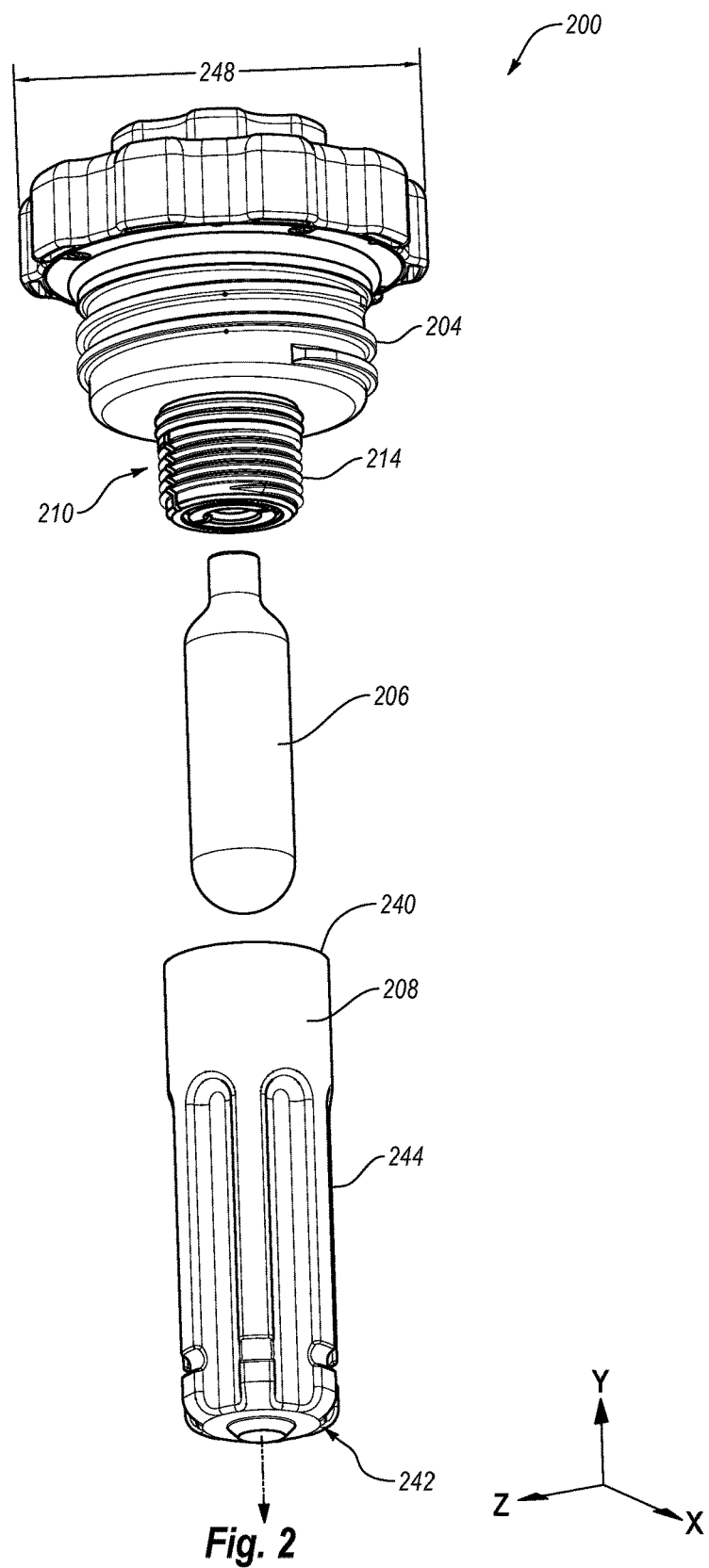
FIG. 2 illustrates an example regulator cap assembly that may be implemented in the beverage dispenser of FIGS. 1A-1C.

FIG. 2 illustrates an example embodiment of the regulator cap assembly 200 that may be implemented in the dispenser 100 of FIGS. 1A-1C. Specifically, FIG. 2 is an exploded view of the regulator cap assembly 200 outside a vessel. The regulator cap assembly 200 may include a cap body 204, a compressed gas reservoir 206, and a gas reservoir sleeve 208.

In general, to use the regulator cap assembly 200, the compressed gas reservoir 206 may be assembled with the cap body 204 and the gas reservoir sleeve 208. To assemble the regulator cap assembly 200, the compressed gas reservoir 206 may be at least partially received in the gas reservoir sleeve 208. The gas reservoir sleeve 208 may then be mechanically attached to the cap body 204.

In particular, the gas reservoir sleeve 208 may include a first end 240 that defines a connection that is configured to mechanically attach to a sleeve interface 214 located at a lower portion 210 of the cap body 204. The gas reservoir sleeve 208 may also include a second end 242 opposite the first end 240 and a sleeve body 244 between the first end 240 and the second end 242. The sleeve body 244 may extend from the cap body 204 in a first direction 220 when the gas reservoir sleeve 208 is mechanically attached to the cap body 204 at the sleeve interface 214.

With combined reference to FIGS. 1B, 1C, and 2, an assembled view of the regulator cap assembly 200 is depicted in FIG. 1C and a view of the assembled regulator cap assembly 200 received in the vessel 102 is depicted in FIG. 1B. Accordingly, the first direction 220 may be oriented such that when the regulator cap assembly 200 is received in the vessel 102, the gas reservoir sleeve 208 is at least partially positioned within the internal volume 106 defined by the vessel 102.

In more detail, the vessel 102 may be filled with the beverage 104 that may contain a supersaturated dissolved gas such as CO2. The dissolved gas exerts a pressure on its surroundings. The compressed gas reservoir 206 is inserted into the gas reservoir sleeve 208 and attached to the cap body 204, thus forming the regulator cap assembly 200. The regulator cap assembly 200 is then inserted into the vessel 102 with the gas reservoir sleeve 208 pointed in the first direction 220 in a negative y-direction toward the bottom of the vessel 102. In this orientation, the compressed gas reservoir 206 is hidden inside the vessel 102 and the working components of the regulator cap assembly 200 such as the dial 202 accessible to a user.

After the regulator cap assembly 200 is received by the vessel 102, the dial 202 can be rotated. In response, the cap body 204 releases a particular amount of pressurized gas into the internal volume 106 of the vessel 102. If a higher pressure of gas is desired, then the dial 202 can be further rotated, which may cause more gas to be released into the internal volume 106 of the vessel 102. The dial 202 can also be rotated in an opposite direction to reduce or to completely shut-off a supply of gas from the compressed gas reservoir 206. For example, if the user wants to remove the regulator cap assembly 200 from the vessel 102, then the user may completely shut-off the supply of gas.

The regulator cap assembly 200 thus stores the compressed gas reservoir 206 and also conceals it within the gas reservoir sleeve 208 during use. The compressed gas reservoir 206 is further hidden within the internal volume 106 of the vessel 102 when the regulator cap assembly 200 is received in the vessel 102 as shown in FIG. 1B. Positioning the compressed gas reservoir 206 out of view and also generally out of the physical reach of the user and other surroundings may provide simplicity, aesthetic appeal, ease of use, improved ergonomics, reduced total number of parts/components, lower cost manufacturing, improved safety, or some combination thereof.

For example, in beverage dispensers in which a gas reservoir is outside of a vessel, the gas reservoir may add a potentially unbalanced shape to the beverage dispenser. The unbalanced shape may result in an unbalanced weight distribution. Moreover, locating the gas reservoir on the outside of the vessel may expose the gas reservoir to physical contact that may cause accidental damage from drops, or hanging onto or hitting other objects, that may break seals and cause a rapid release of high-pressure gas. Some other dispensers utilize a separate fill device which houses a gas reservoir in a separate handheld pump. These handheld pumps can become lost, misused, or become accidentally opened or damaged, thus causing the high-pressure gas to release suddenly. Accordingly, integrating the compressed gas reservoir 206 into the regulator cap assembly 200 may improve safety and ergonomics. In addition, integrating the compressed gas reservoir 206 into the regulator cap assembly 200 may reduce the risk of misplacing the compressed gas reservoir 206.

In the embodiment depicted in FIG. 2 (and other FIGS. of this disclosure), the sleeve interface 214 includes a threaded region that enables the gas reservoir sleeve 208 to mechanically attach to the cap body 204. In some embodiments, the sleeve interface 214 may include another structure that enables mechanical attachment between the gas reservoir sleeve 208 and the cap body 204. For instance, the sleeve interface 214 may include a locking press-fit, a fastened connection, a locking-clip connection, and the like.

The cap body 204 of FIG. 2 includes a cap diameter 248 that allows it to be held with a human hand. For example, the cap diameter 248 of the cap body 204 shown in FIG. 2 may be about 60 mm. In other embodiments, the diameter may be between about 38 mm and about 153 mm. In other embodiments, one or more of the components may include another shape or size.

When the gas reservoir sleeve 208 is mechanically attached to the cap body 204, a seal of the compressed gas reservoir 206 may be pierced. Piercing the seal may allow gas contained in the compressed gas reservoir 206 to flow from the compressed gas reservoir 206 to the cap body 204.

The compressed gas reservoir 206 may include any type of cartridge that includes a compressed gas and/or any standard sized gas reservoir such as a carbon dioxide (CO2) cartridge available in the food industry. For example, the compressed gas reservoir 206 may include a CO2 cartridge, a nitrogen (N2) cartridge, an argon cartridge, and a mixed gas (e.g., 60% N2-40% CO2) cartridge. Each type of compressed gas reservoir 206 may be suitable for a particular type of beverage (e.g., the beverage 104). For instance, the compressed gas reservoir 206 may include an 8 gram, 16 gram, and/or 33 gram CO2 cartridge. Embodiments configured to receive the 33 gram CO2 cartridge may be further configured to carbonate the beverage in the vessel 102. The N2 cartridge may be suitable for wines, which may not be carbonated but may benefit from displacement of atmospheric air from the vessel 102 before storage of the wine. The argon cartridge may be suitable for wine or spirits and the mixed gas cartridge may be suitable for nitrogenated beers.

Figure 3A:
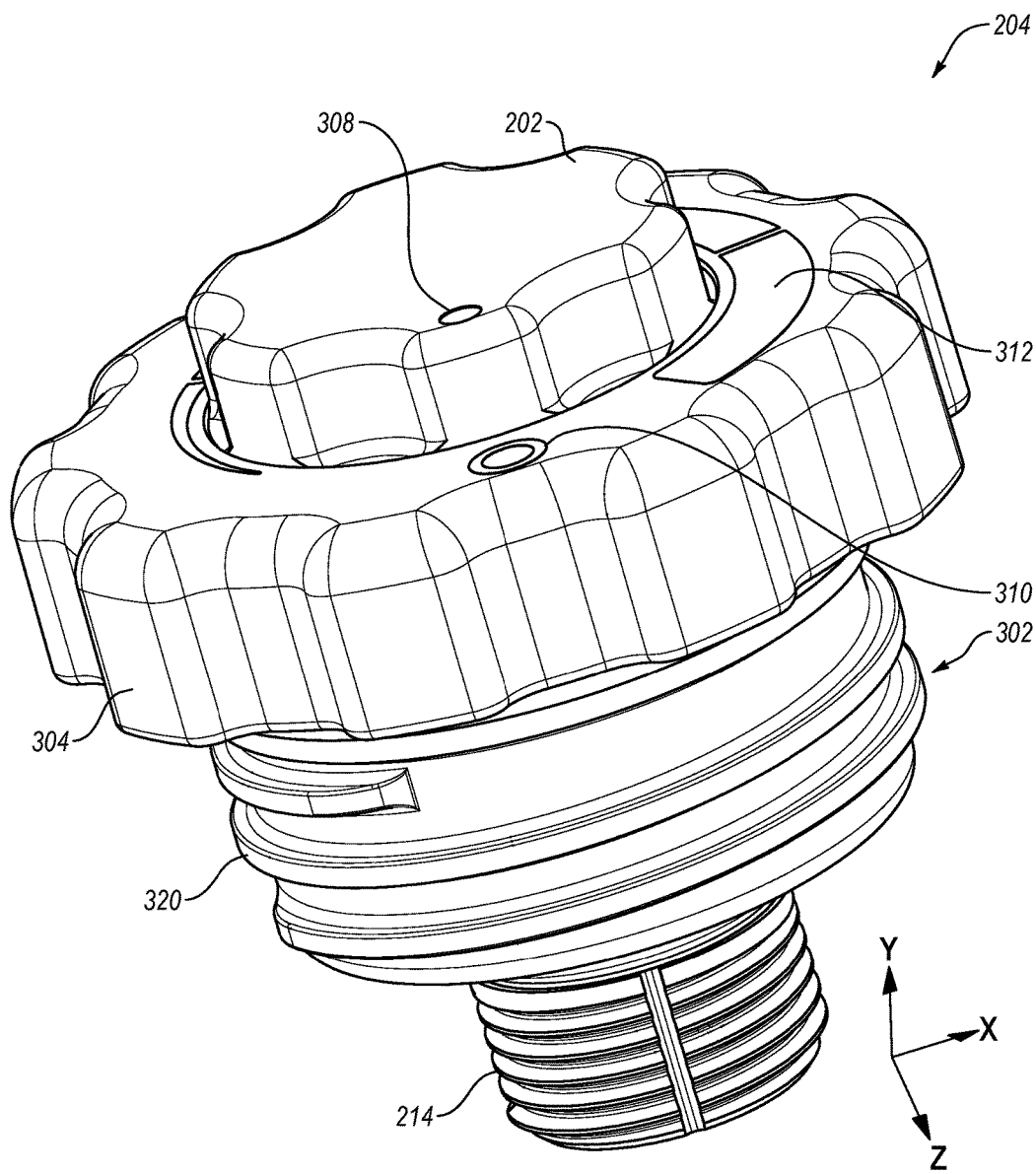
FIG. 3A illustrates an example cap body that may be implemented in the beverage dispenser of FIGS. 1A-1C.
Figure 3B:
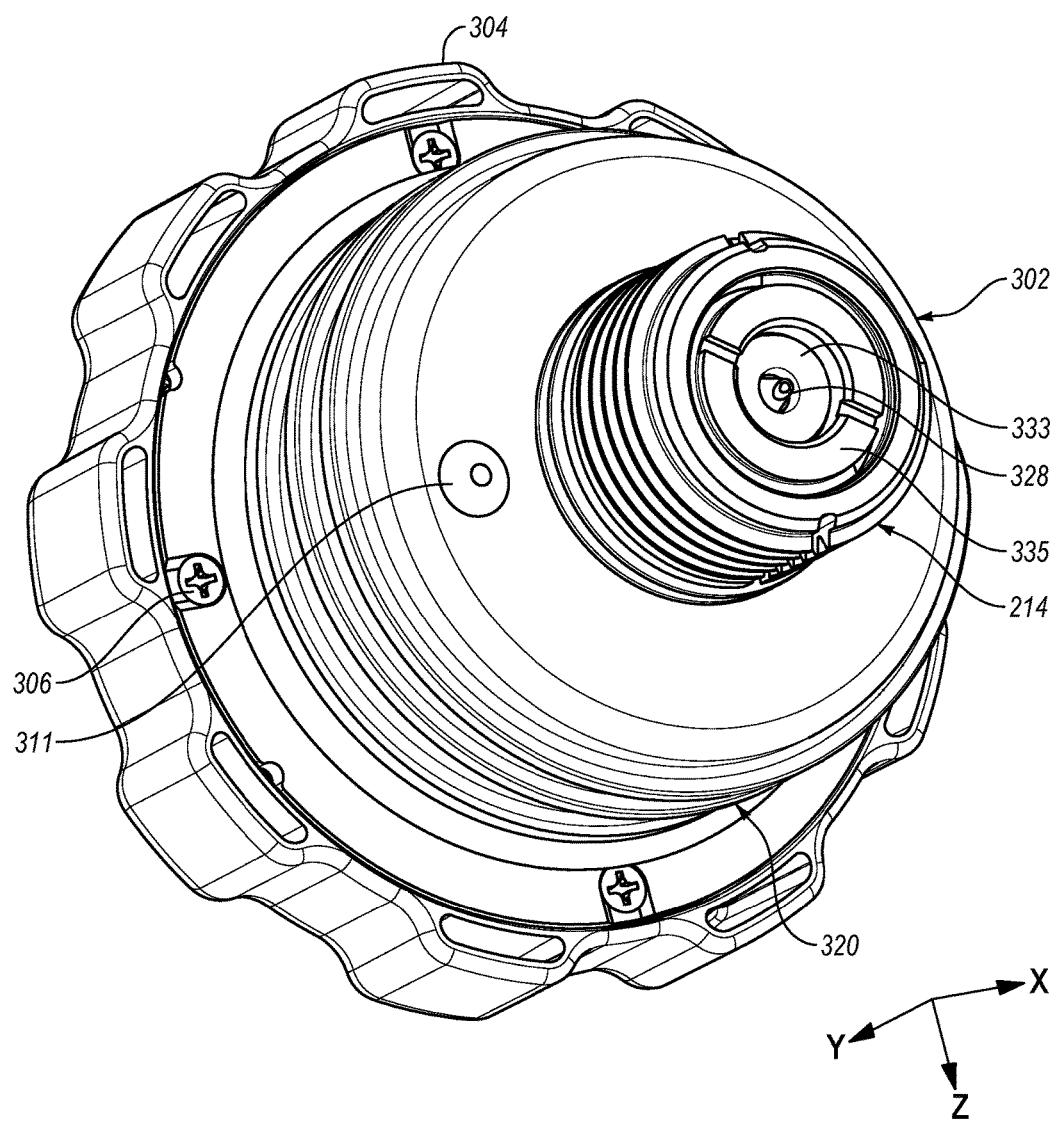
FIG. 3B illustrates another view of the cap body of FIG. 3A.
Figure 3C:
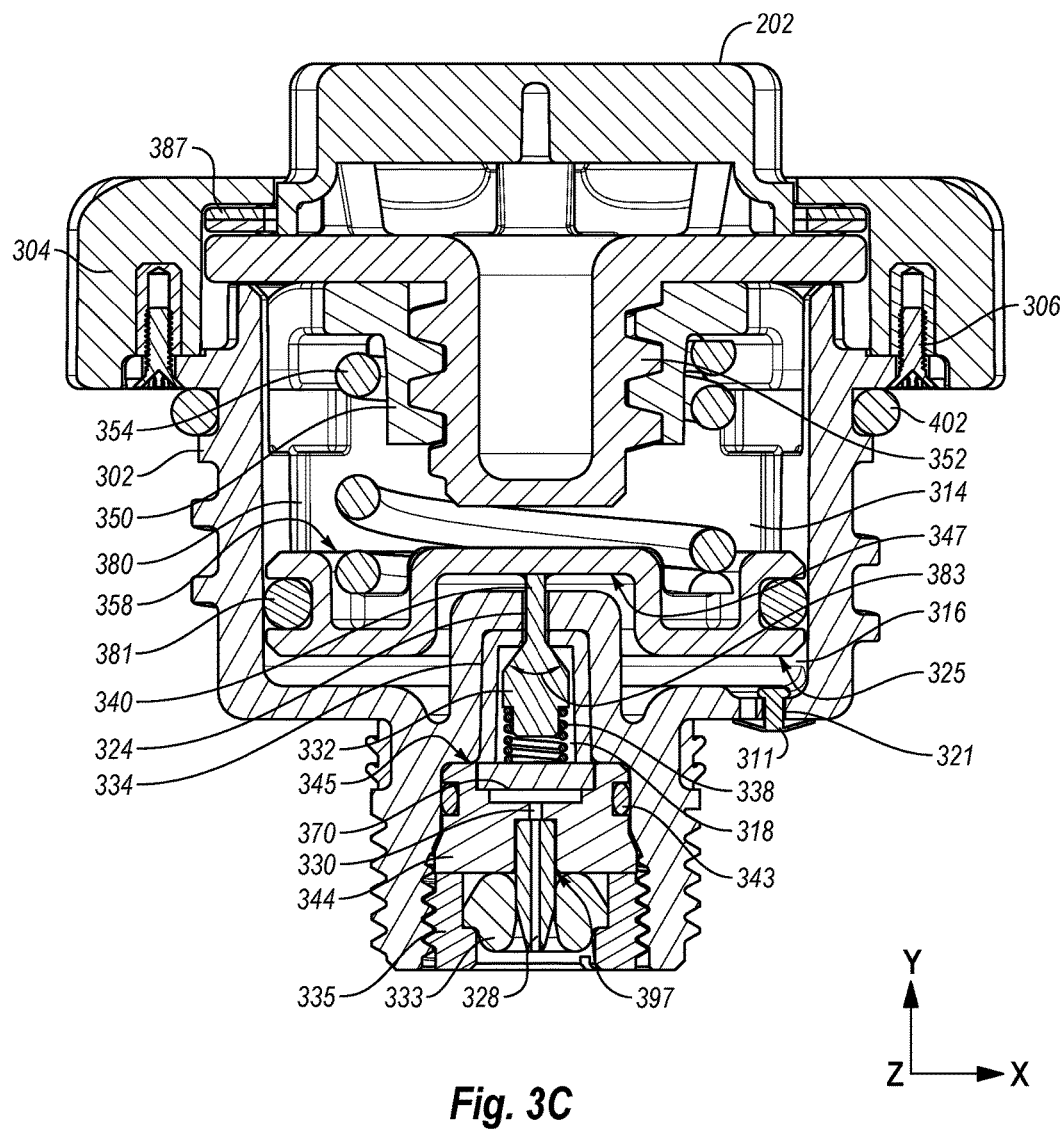
FIG. 3C illustrates another view of the cap body of FIG. 3A.
Figure 3D:
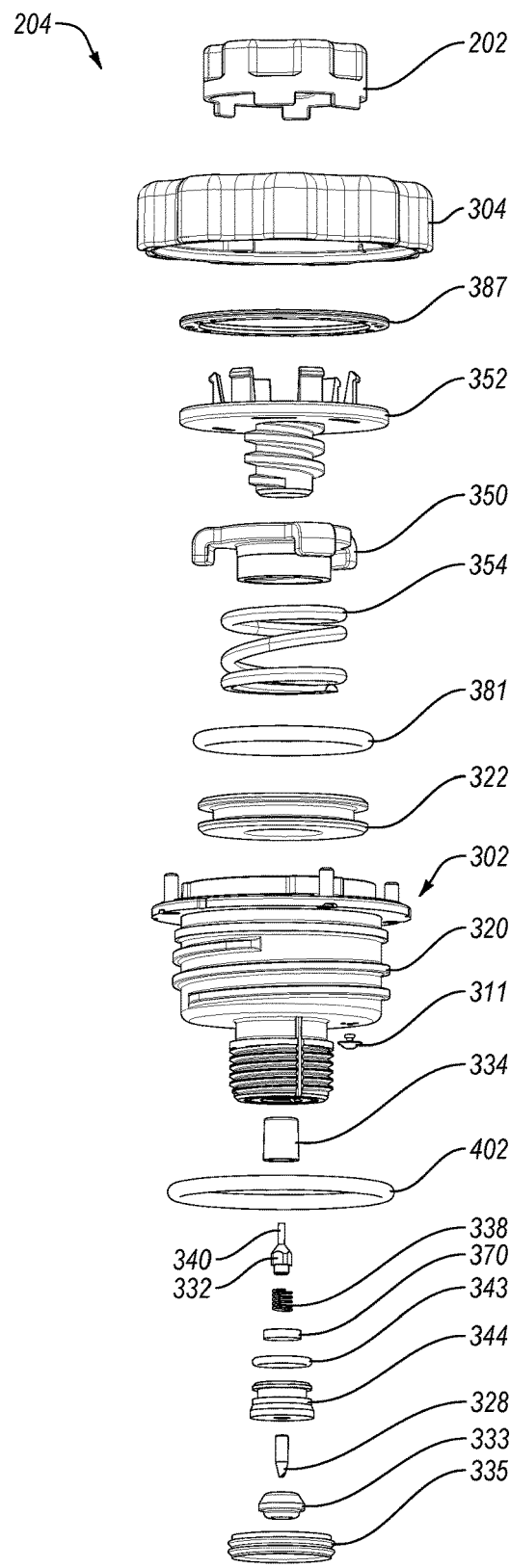
FIG. 3D illustrates another view of the cap body of FIG. 3A.

FIGS. 3A-3D illustrate an example embodiment of the cap body 204 that may be implemented in the dispenser 100 of FIGS. 1A-1C. In particular, FIG. 3A is a first perspective view of the cap body 204. FIG. 3B is a second perspective view of the cap body 204. FIG. 3C is a sectional view of the cap body 204. FIG. 3D is an exploded view of the cap body.

The cap body 204 generally contains one or more components that enable regulation of a pressure applied by the cap body 204 to an internal volume defined by a vessel 102. For example, with combined reference to FIGS. 1B, 2, and 3A, the cap body 204 may be configured to receive the compressed gas reservoir 206. Through selection of a rotational position of the dial 202, a particular pressure can be output by the cap body 204 to the beverage 104 in the internal volume 106 of the vessel 102.

Referring to FIGS. 3A and 3B, external views of the cap body 204 are depicted. Viewed externally, the cap body 204 may include the dial 202 (FIG. 3A only), a lower cap body 302, and a hand grip 304.

The hand grip 304 makes up an outer circumference of the cap body 204. With combined reference to FIGS. 1B, 2, and 3A-3B, the hand grip 304 allows the user to grip the cap body 204 while assembling and disassembling the regulator cap assembly 200. For example, the user can hold the cap body 204 at the hand grip 304 and rotate the gas reservoir sleeve 208 relative to the cap body 204. Additionally, the hand grip 304 may enable the user to assemble and disassemble the dispenser 100 of FIG. 1B. For example, the user can grip the hand grip 304 while rotating the regulator cap assembly relative to the vessel 102.

As best illustrated in FIG. 3B, the hand grip 304 may be mechanically connected to the lower cap body 302. For example, the grip fasteners 306 may mechanically connect the hand grip 304 to the lower cap body 302. In FIG. 3B only one of the grip fasteners 306 is labeled. Mechanically connecting the hand grip 304 to the lower cap body 302 enables a user to rotate the cap body 204 using the hand grip 304.

The hand grip 304 is not mechanically connected to the dial 202. Instead, the hand grip 304 surrounds the dial 202. The dial 202 may rotate within the hand grip 304 and not result in a rotation of the cap body 204. Accordingly, when the cap body 204 is received in a vessel 102, the cap body 204 may be secured to the vessel 102 through rotation of the cap body 204 relative to the vessel 102, using the hand grip 304. While the cap body 204 is received by the vessel 102, the dial 202 may be rotated without affecting a rotational position of the cap body 204 relative to the vessel 102. As described elsewhere in this disclosure, rotation of the dial 202 determines the pressure applied by the cap body 204. Accordingly, independence of the dial 202 from the hand grip 304 and lower cap body 302 enables changing the pressure without loosening the cap body 204.

With continued reference to FIG. 3B, the lower cap body 302 may include the sleeve interface 214 and a vessel interface 320. As discussed elsewhere in this disclosure, the sleeve interface 214 may be configured to mechanically attach a gas reservoir sleeve (e.g., the gas reservoir sleeve 208 of FIG. 2). The vessel interface 320 may be configured to couple with a vessel (e.g., the vessel 102 of FIGS. 1A-1C).

With reference to FIG. 3A, the dial 202 and the hand grip 304 may include thereon indicators 308, 310, and 312. The indicators 308, 310, and 312 may indicate to a user an approximate pressure applied by the cap body 204. In the depicted embodiment, the dial 202 includes a first indicator 308 that indicates a position of the dial 202. A second indicator 310, may correspond to a position of the dial 202 that results in zero pressure applied by the cap body 204. Thus, when the first indicator 308 is aligned with the second indicator 310, the cap body may not apply a pressure. A third indicator 312 may include a rotational-triangular indicator that increases in height as it progresses in a clockwise direction. The third indicator 312 may indicate that as the dial 202 is rotated in a clockwise direction, the cap body 204 may apply an increasingly higher pressure. In the depicted embodiment, flow from the compressed gas reservoir 206 may be shut off when the dial 202 is rotated completely counter-clockwise and pressure delivered to the vessel 102 by the cap body 204 may achieve a maximum when the dial 202 is rotated completely in the clockwise direction. In other embodiments, the compressed gas reservoir 206 may be completely open in the counter-clockwise direction and shut off when the dial 202 is rotated completely clockwise. Additionally or alternatively, other indicators may be used with the cap body 204.

Referring to FIGS. 3C and 3D, an assembled view of the cap body 204 is depicted in FIG. 3C and an exploded view of the cap body 204 is depicted in FIG. 3D. The cap body 204 may define, at least a part of a border of an ambient pressure cavity 314, a low pressure cavity 316, and a high pressure cavity 318. In FIG. 3D, the ambient pressure cavity 314, the low pressure cavity 316, and the high pressure cavity 318 are not visible.

In general, a pressure output by the cap body 204 is regulated by controlling an amount of gas that is transferred from the high pressure cavity 318, which receives a gas from a compressed gas reservoir, to the low pressure cavity 316. The amount of the gas transferred from the high pressure cavity 318 to the low pressure cavity 316 is based on a main spring force applied to a diaphragm 322. The main spring force is further based on a rotational position of the dial 202. Thus, the rotational position of the dial 202 determines the main spring force applied to the diaphragm 322 which in turn controls transfer of gas from the high pressure cavity 318 to the low pressure cavity 316. Some additional details of these components (e.g., 314, 316, 318, and 322) and operations performed by these components are provided below.

The high pressure cavity 318 is configured to receive pressurized gas from a compressed gas reservoir (e.g., the compressed gas reservoir 206 of FIG. 2). A boundary of the high pressure cavity 318 may be defined by a cavity surface 345 of a pressure plate 344. The pressure plate 344 is positioned in a lower portion of the cap body 204. The pressure plate 344 defines a plate channel 397 between the high pressure cavity 318 and a volume configured to receive a portion of a compressed gas reservoir 206.

A reservoir piercer 328 may be at least partially positioned in the plate channel 397. The reservoir piercer 328 is configured to pierce an end of a compressed gas reservoir when the compressed gas reservoir is received in a gas reservoir sleeve. For example, with combined reference to FIGS. 2 and 3C, the compressed gas reservoir 206 may be received by the gas reservoir sleeve 208. As a user mechanically attaches the gas reservoir sleeve 208 to the cap body 204, the reservoir piercer 328 may pierce the end of the compressed gas reservoir 206.

Referring back to FIGS. 3C and 3D, the reservoir piercer 328 may further define a pressurized gas passageway 330 that is configured to allow gas in the compressed gas reservoir to pass from the compressed gas reservoir to the high pressure cavity 318. For example, after the compressed gas reservoir is pierced by the reservoir piercer 328, the gas contained in the compressed gas reservoir fills the high pressure cavity 318 via the pressurized gas passageway 330.

The pressure plate 344 is secured to cap body 204 by a threaded interface. The pressure plate 344 includes a pressure plate seal 343 that isolates the high pressure cavity 318 from the volume configured to receive a portion of a compressed gas reservoir. The reservoir piercer 328 may be surrounded on its lower end (lower y-direction) by a pressure reservoir seal 333. The reservoir piercer 328, the pressure plate 344, the pressure plate seal 343, and the pressure reservoir seal 333 are secured in place by a retainer 335

The pressure reservoir seal 333 may be configured to seal a cartridge face for long periods of time (e.g., more than 24 hours) without significant loss of sealing. The pressure reservoir seal 333 is configured to generate high sealing pressures while maintaining material strain within acceptable creep limits to maintain sealing force for the long period of time. The pressure reservoir seal 333 may be more effective than a solid, flat gasket, which may take on large internal strains to meet the required sealing force and fail due to cold flow of the material and the low rebound of the flat gasket.

In some embodiments, the cap body 204 may include a debris filter 370. An example of the debris filter 370 may be constructed of a piece of sintered metal filter. The debris filter 370 may be included in the pressure plate 344. The debris filter 370 may act as a filter to remove materials prior to introduction into the high pressure cavity 318. The sintered metal filter has a pore size of a several microns (e.g., between about 3 microns and about 20 microns). Such a pore size may allow gas to pass through while stopping any foreign material from continuing past removal of materials and may reduce a likelihood that the material will become embedded on the high side pin 340 or the piston seat 334. Materials, if allowed to proceed into the high pressure cavity 318, may lead to unwanted gas leakage from the high pressure cavity 318 to the low pressure cavity 316. The manifold area directly upstream of the debris filter 370 allows any blocked material to accumulate without risk of plugging the pressurized gas passageway 330 of the reservoir piercer 328.

The high pressure cavity 318 is connected to the low pressure cavity 316 via a high pressure gas passageway 324. The high pressure gas passageway 324 is defined at least partially in the cap body 204. A piston 332, which is at least partially positioned in the high pressure cavity 318, is configured to regulate introduction of gas into the high pressure gas passageway 324 from the high pressure cavity 318. For example, a piston seat 334 is positioned on a high pressure cavity side of the high pressure gas passageway 324. When the piston 332 is seated against the piston seat 334, the gas is substantially prevented from entering the high pressure gas passageway 324. When the piston 332 is not seated against the piston seat 334, the gas can enter the high pressure gas passageway 324 and be ported to the low pressure cavity 316.

In the depicted embodiment, the piston 332 is cone-shaped and/or generally includes a tapered profile or conical profile (collectively, a cone shape). The cone shape of the piston 332 allows for smooth flow of the gas into the high pressure gas passageway 324. The shape of the piston 332 provides a variable area of the surface of the piston 332 with respect to the area of the piston seat 334, as the piston 332 moves translates substantially in the y-direction.

The shape of the piston 332 is an improvement over similar devices implementing a flat or a rounded piston. In particular, in these devices the shapes allow a piston to flutter or rapidly open and close. In contrast, the conical shape of the piston 332 reduces the fluttering and allows the piston 332 to operate with substantially smooth transitions from open to closed and vice versa. The shape of the piston 332 may include an internal angle 383 of between about 15 and about 60 degrees. In some embodiments, the internal angle may be about 50 degrees.

The piston seat 334 may include a soft seat. For example, the soft seat may be constructed of a material softer than the relatively hard Acetyl plastic, which may be used for the cap body 204. Some embodiments may include, for example, FKM (e.g., by ASTM D1418 standard or equivalent), polyethylene, TEFLON®, or any other soft and durable plastic or elastomer.

The piston seat 334 may be configured to interfere with walls of the high pressure cavity 318. Such interference creates a gas tight seal. For instance, by extending downward along the walls of the high pressure cavity 318, a sealing force is increased by pressure in the high pressure cavity 318 that presses the piston seat 334 against the walls of the high pressure cavity 318. In some embodiments, the piston seat 334 may take another shape. For example, the piston seat 334 may be a ring, may extend partially down the walls of the high pressure cavity, or may be integrated into the cap body 204, for instance.

A position of the piston 332 (e.g., whether the piston 332 is seated against the piston seat 334 or not) is determined by a high pressure spring 338 and a high side pin 340. The high pressure spring 338 is positioned between the pressure plate 344 and the piston 332. The high pressure spring 338 is configured to apply a spring force to the piston 332 in a first direction that acts to seat the piston 332 against the piston seat 334.

The high side pin 340 is configured to extend through the high pressure gas passageway 324 and to contact piston translation portion 347 of the diaphragm 322. The diaphragm 322 may contact and translate the high side pin 340, which forces the piston 332 off the piston seat 334. When the high side pin 340 forces the piston 332 off the piston seat 334, gas is allowed to flow from the high pressure cavity 318 into the low pressure cavity 316.

In some embodiments, the high side pin 340 is attached to the piston 332. In some embodiments, the high side pin 340 is attached to the diaphragm 322 or the high side pin 340 is not attached to either the piston 332 or the diaphragm 322.

The low pressure cavity 316 defines a low pressure gas passageway 321. The low pressure gas passageway 321 penetrates the cap body 204. From the low pressure gas passageway 321, the gas in the low pressure cavity 316 can pass into an internal volume of a vessel when the cap body 204 is received in the vessel. In addition, pressures in the low pressure cavity 316 press against a low pressure surface 325 of the diaphragm 322. The pressure accordingly acts to move the diaphragm 322 in a positive y-direction.

In some embodiments, the low pressure gas passageway 321 may be fit with a one-way valve 311. The one-way valve 311 may include an umbrella style elastomeric one-way valve that is configured to allow gas passage from the low pressure cavity 316 to an internal volume defined by a vessel that receives the cap body 204 and to stop gas or liquid passage in an opposite direction.

The ambient pressure cavity 314 (FIG. 3C only) may be defined within the cap body 204 and above the diaphragm 322 (e.g., having a higher y-dimension). The diaphragm 322 may include a diaphragm seal 381 that forms a gas-tight seal between the low pressure cavity 316 and the ambient pressure cavity 314. A spring hat 350, a drive screw 352, and a main spring 354 may be positioned at least partially within the ambient pressure cavity 314.

The drive screw 352 is mechanically coupled to an internal portion of the dial 202. Accordingly, rotation of the dial 202 results in rotation of the drive screw 352. In addition, the drive screw 352 may define a first portion of a threaded connection. A second, complimentary portion of the threaded connection is included in the spring hat 350. The spring hat 350 is restrained from rotational motion by guide rails that are integral to the cap body 204, which translate the rotational motion of the drive screw 352 into linear motion of a spring hat 350 relative to the drive screw 352. Accordingly, the rotation of the dial 202 rotates the drive screw 352. As the drive screw 352 is rotated, the spring hat 350 is translated by the threaded connection in substantially the y-direction.

For example, rotation of the dial 202 in a counterclockwise direction to a first rotational position may translate the spring hat 350 relative to the drive screw 352 in a negative y-direction, which may result in translation of the spring hat 350 to a first particular distance relative to the drive screw 352. Similarly, rotation of the dial 202 in a clockwise direction to a second rotational position may translate the spring hat 350 relative to the drive screw 352 in a positive y-direction, which may result in translation of the spring hat 350 to a second particular distance relative to the drive screw 352.

The drive screw 352 extends downward (in a y-direction) a particular distance toward the diaphragm 322. In some embodiments, the particular distance corresponds to a distance required to ensure some portion of the high side pin 340 stays within the high pressure gas passageway 324. The particular distance, thus prevents or reduces the likelihood that the high side pin 340 comes out of the high pressure gas passageway 324, which may cause a loss of alignment required for the high side pin 340 to move back into the high pressure gas passageway 324. The length of the drive screw 352 relative to the diaphragm 322 also works as a backstop for the movement of the diaphragm 322 to provide a hard stop beyond which the diaphragm 322 cannot move away from the low pressure cavity 316.

In some embodiments, the cap body 204 includes a thrust bearing 387 between the drive screw 352 and the hand grip 304. The thrust bearing 387 reduces running friction between the drive screw 352 and the hand grip 304 when under pressure, which may result in less torque to be applied to the dial 202 to change its position.

The main spring 354 may be positioned between a spring surface 358 of the diaphragm 322 and the spring hat 350. Translation of the spring hat 350 in the y-direction may compress or enable extension of the main spring 354 between the diaphragm 322 and the spring hat 350. Accordingly, rotation of the dial 202 affects compression of the main spring 354 due to the change in the distance between the spring hat 350 and the diaphragm 322.

The main spring 354 applies the main spring force against the diaphragm 322 in the negative y-direction. The magnitude of the main spring force may be determined at least in part by the distance between the spring hat 350 and the diaphragm 322. Accordingly, a rotational position of the dial 202 may correspond to a particular distance between the spring hat 350 and the diaphragm 322 and determine a magnitude of the main spring force.

The diaphragm 322 is positioned between the ambient pressure cavity 314 and the low pressure cavity 316. The pressure in the low pressure cavity 316 pushes the diaphragm 322 in the positive y-direction while the main spring force presses the diaphragm 322 in the negative y-direction.

When a main spring force applied by the main spring 354 is greater than a force resulting from the pressure in the low pressure cavity 316, the diaphragm 322 translates in a negative y-direction. The piston translation portion 347 then translates the piston 332 relative to the piston seat 334, which results in gas in the high pressure cavity 318 being introduced into the low pressure cavity 316 (and into the internal volume via the low pressure gas passageway 321). The gas introduced to the low pressure cavity 316 increases the pressure and the resulting force acting on the diaphragm 322. As the pressure increases, the diaphragm 322 translates in the positive y-direction, which allows the piston 332 to seat against the piston seat 334 under the high pressure spring force applied by the high pressure spring 338. When the piston 332 seats against the piston seat 334, introduction of the gas into the low pressure cavity 316 stops.

In some embodiments, the regulator cap assembly 200 may be able to deliver gas to maintain a desired pressure of the vessel 102 across a range of gas pressures in the high pressure cavity 318. The design of the regulator cap assembly 200 accomplishes this at least in part by a specific ratio of a diameter of the high pressure gas passageway 324 versus a diameter of the diaphragm 322. The ratio may in some embodiments be between about 0.5 and about 0.005. In some embodiments, the ratio may include a value of 0.05. The ratio allows maintenance of a uniform pressure in the low pressure cavity 316, corresponding to the rotational position of the dial 202, throughout a range of pressures from maximum to minimum in the high pressure cavity 318, that changes as a beverage is dispensed and gas flows from the compressed gas reservoir 206 to the vessel 102.

With combined reference to FIGS. 1B, 3C, and 3D, the pressure in the low pressure cavity 316 and the internal volume 106 may be maintained based on a particular rotational position of the dial 202. For example, the main spring force is determined by the particular rotational position of the dial 202. The position of the diaphragm 322 may be determined based on a balance between a pressure in the low pressure cavity 316 and the main spring force at the rotational position of the dial 202. The pressure in the low pressure cavity 316 may be decreased by a decrease in volume of the beverage 104 in the internal volume 106. For instance, when the beverage 104 is dispensed, a non-liquid volume in the vessel 102 increases, which reduces the pressure in the low pressure cavity 316. When the pressure decreases, the diaphragm 322 may move in the negative y-direction, which may un-seat the piston 332 enabling gas introduction to the low pressure cavity 316. The gas increases the pressure in the low pressure cavity 316. The increase in the pressure of the low pressure cavity 316 forces the diaphragm 322 in the positive y-direction, which reduces the force applied to the high side pin 340 and allows the piston 332 to seat. The balance is reestablished as the pressure in the low pressure cavity 316 increases. If the pressure is not restored after the beverage 104 is dispensed, then the resulting drop in pressure in the vessel 102 may cause dissolved gas to escape from the beverage 104 into the non-liquid volume of the vessel 102 and the beverage 104 may go flat.

The cap body 204 may include one or more overpressure vent channels 380. The overpressure vent channels 380 may be defined in an internal surface of a side wall of the cap body 204. The overpressure vent channels 380 may extend from the ambient pressure cavity 314 to a distance defined relative to a maximum travel distance of the diaphragm 322. For instance, the overpressure vent channels 380 may extend down to a maximum travel distance that is located above a y-dimension of a diaphragm seal 381 when the diaphragm 322 is not engaging the high side pin 340.

If the pressure in the low pressure cavity 316 exceeds a pressure sufficient to force the diaphragm 322 to the maximum travel distance (e.g., due to slow leaks within the cap body 204 or due to a downward adjustment of the pressure set point), then the diaphragm 322 will move upward against the main spring 354. When the diaphragm 322 moves above the maximum travel distance, the gas in the low pressure cavity 316 may enter the overpressure vent channels 380 and then enter the ambient pressure cavity 314. The gas may then pass to a surrounding environment through an opening (not shown) defined by ambient pressure cavity 314. The opening may be located in the hand grip 304 in some embodiments. In the embodiment depicted in FIGS. 3C and 3D, there are three overpressure vent channels 380 that are molded into the side walls of the cap body 204. In some embodiments, fewer than three or more than three overpressure vent channels may be included in the cap body 204.

The overpressure vent channels 380 limit the pressure to a value only slightly above the set point of the cap body 204. The overpressure vent channels 380 therefore reduce the degree of over-carbonation of a beverage in circumstances of a component failure such as a leak of gas to the low pressure cavity 316. Additionally, the overpressure vent channels 380 may make such failures transparent to the user and may only affect the use in cases of long storage times, in which the loss of gas prevents dispensing of a beverage.

In embodiments implementing the overpressure vent channels 380, the drive screw 352 may allow the diaphragm 322 to move upwards up to about 4 mm or another suitable distance in reaction to pressure within the low pressure cavity 316. This allows the diaphragm 322 seal to move upward beyond the overpressure vent channels 380 and allowing gas to escape into the ambient pressure cavity 314 as discussed above.

In some embodiments, the diaphragm 322 may include one or more diaphragm spacers that are located on a low pressure surface 325 of the diaphragm 322. The diaphragm spacers hit the cap body 204 to provide a spacing between the diaphragm 322 and the cap body 204 when the diaphragm 322 is in its lowest (lowest y-dimension) position. The diaphragm spacers may also accommodate for a space for overpressure relief valve.

In some embodiments, the diaphragm 322 includes an overpressure relief valve. When the overpressure relief valve is open, gas passes from the low pressure cavity 316 to the ambient pressure cavity 314, which releases a portion of the gas from the low pressure cavity 316. The gas may then pass to a surrounding environment through an opening (not shown) defined by ambient pressure cavity 314. The opening may be located in the hand grip 304 in some embodiments.

With combined reference to FIGS. 1A-3D, a first step in using the regulator cap assembly 200 may be to insert the compressed gas reservoir 206 into the gas reservoir sleeve 208. Next, the user rotates the gas reservoir sleeve 208 onto the sleeve interface 214 thus moving the compressed gas reservoir 206 toward the regulator cap assembly 200 and the reservoir piercer 328. As the gas reservoir sleeve 208 reaches the end of the threaded portion of the sleeve interface 214, the reservoir piercer 328 breaks a metal seal on the compressed gas reservoir 206, thus allowing the contents of the compressed gas reservoir 206 to fill the high pressure cavity 318.

The high pressure cavity 318 is isolated from the low pressure cavity 316 by the piston 332, which is held in place against the piston seat 334 by the combined force of the high pressure spring 338 and the gas in the high pressure cavity 318.

The pressure in the high pressure cavity 318 is in equilibrium with the pressure inside the compressed gas reservoir 206. On the other side of the piston seat 334, in the low pressure cavity 316, the pressure is in equilibrium with the contents of the vessel 102, i.e., no additional gas pressure has been applied. Prior to attaching the regulator cap assembly 200, the pressure inside the low pressure cavity 316 is in equilibrium with the atmospheric pressure. If the vessel 102 is filled with the beverage 104 prior to attaching the regulator cap assembly 200, the beverage 104 may carry aqueous gases at a pressure above atmospheric pressure. In this case, the pressure of the gases in the beverage 104 may equilibrate with the pressure in the low pressure cavity 316.

The user can choose to increase the pressure of the contents of the vessel 102 to meet the desired beverage storage conditions. To do so, the user can rotate the dial 202 (e.g., in the clockwise direction). As the dial 202 is rotated by the user, it in turn rotates the drive screw 352. As the drive screw 352 rotates, its threaded portion is in contact with the portion of the spring hat 350, and thus transmits motion to the spring hat 350, which motion is resolved into a translational motion in the downward (negative y) direction, thus compressing the main spring 354. The compression of the main spring 354 in turn exerts force on the diaphragm 322. The main spring 354 is in contact with the diaphragm 322 by way of several ribs that locate the bottom portion of the main spring 354 co-axially with both the diaphragm 322 and spring hat 350. Rotating the dial 202 causes compression of the main spring 354 that exerts a force on the diaphragm 322. A force is also exerted on the opposite side of the diaphragm 322 by the pressure in the low pressure cavity 316.

The diaphragm seal 381 forms a seal between the low pressure cavity 316 and the ambient pressure cavity 314, thus separating these two cavities 316 and 314. If the force exerted by the main spring 354 on the diaphragm 322 is greater than the force exerted on the diaphragm 322 by the pressure in the low pressure cavity 316, the diaphragm 322 moves in the direction toward the low pressure cavity 316 until these two forces acting on each side of the diaphragm 322 come to equilibrium. As the diaphragm 322 moves toward the low pressure cavity 316 the high side pin 340 may contact the piston 332. When the high side pin 340 contacts the piston 332 it may exert a force on the piston 332 that causes it to unseat from the piston seat 334.

When the piston 332 is unseated from the piston seat 334, gas is allowed to flow from the high pressure cavity 318 into the low pressure cavity 316, thus increasing the pressure in the low pressure cavity 316, thus increasing the force the gas pressure in the low pressure cavity 316 acts on the diaphragm 322. In this case, gas flows from the high pressure cavity 318 into the low pressure cavity 316 until the pressure in the low pressure cavity 316 exerts a force on the diaphragm 322 sufficient to compress the main spring 354, and thus allows the diaphragm 322 to move in a direction away from the low pressure cavity 316.

When the main spring 354 compresses and the diaphragm 322 moves away from the low pressure cavity 316 the high side pin 340 exerts less force on the piston 332, and may move away from the piston 332 entirely, so the high side pin 340 no longer contacts the piston 332, thus allowing the piston 332 to seat onto the piston seat 334 and stop the flow of gas from the high pressure cavity 318 to the low pressure cavity 316. Prior to the piston 332 re-seating on the piston seat 334, as gas flows from the high pressure cavity 318 into the low pressure cavity 316, it also flows through the low pressure gas passageway 321 and into the vessel 102 until the pressure of the low pressure cavity 316 and the vessel 102 are in equilibrium. In this way, the regulator cap assembly 200 can exert and control a specified gas pressure inside the vessel 102 and thus control the conditions of the beverage stored inside the vessel 102.

The user has moved the dial 202 to a position that corresponds to a desired pressure. This position corresponds to some point between or including the furthest most counter-clockwise stopping point of the dial 202 and the furthest most clockwise stopping point of the dial 202. These positions are associated with the minimum and maximum pressures that can be delivered by the regulator cap assembly 200. At the minimum position the high side pin 340 does not contact the piston 332 and thus no gas is released from the high pressure cavity 318 or delivered by the high pressure reservoir into the low pressure cavity 316 or the vessel 102. Once the user chooses to deliver pressure to the vessel 102 by rotating the dial 202, the user can check on the pressure inside the vessel 102 by viewing the pressure gauge 120 as a feedback for setting the desired pressure. The user may also check the pressure inside the vessel 102 at any time, using the pressure gauge 120 before or after rotating the dial 202. The user can also check the temperature inside the vessel 102 at any time by viewing the temperature gauge (if included). If the user chooses not to increase the pressure inside the vessel 102, this can be accomplished by not rotating the dial 202.

Additionally, the user may choose not to apply gas pressure to the vessel 102 at a present time, and delay pressurization. For example, beers are often over-carbonated at the draft source and have excess aqueous gas that escapes after filling the vessel 102. If the vessel 102 is immediately capped, its contents may maintain an adequate level of aqueous gas to preserve its original quality without the immediate need for supply from the compressed gas reservoir 206. Selectively applying the pressure may enable user control as to when the pressure is delivered from the compressed gas reservoir 206.

This overall action of the regulator cap assembly 200 results in a seamless user interaction with the regulator cap assembly 200 by hiding the internal workings of the regulator, resulting in a simple and carefree interaction for the user. The tactile interface the user interacts with is limited to rotating the dial 202.

Figure 4:
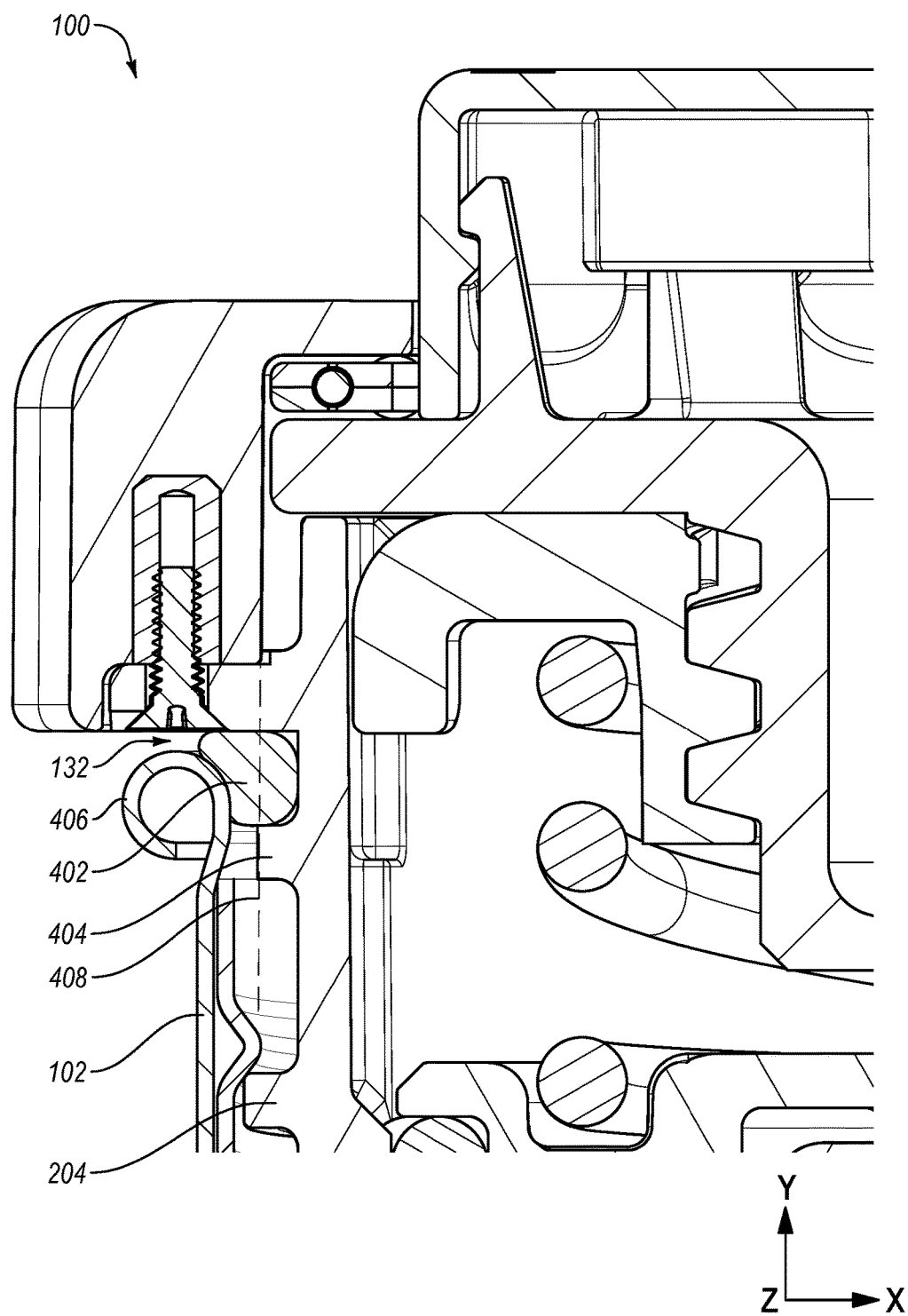
FIG. 4 illustrates an example vessel interface seal that may be implemented in the beverage dispenser of FIGS. 1A-1C.

FIG. 4 illustrates an example vessel interface seal 402 that may be implemented in the dispenser 100 of FIGS. 1A-1C. In particular, FIG. 4 depicts a detailed view of a portion of the dispenser 100 that includes the cap body 204 and the vessel 102. In FIG. 4, the vessel interface seal 402 is depicted with a deformed cross section that may form a gas seal between a rim 406 of the vessel 102 and the cap body 204. For example, with combined reference to FIGS. 3C and 4, the vessel interface seal 402 may include a substantially circular cross section. As the cap body 204 is rotated relative to the mouth 132 of the vessel 102, a vessel interface seal recess 404 retains the vessel interface seal 402 relative to cap body 204. The rotation of the cap body 204 relative to the mouth 132 deforms the vessel interface seal 402.

In the depicted embodiment, the vessel interface seal recess 404 is configured to position the vessel interface seal 402 relative to a rim 406 of the vessel 102 such that the rim 406 is aligned outside of a great plane 408 of the vessel interface seal recess 404. The alignment of the vessel interface seal 402 relative to the rim 406 allows for deformation of a large portion (e.g. greater than 50%) of the vessel interface seal 402 into a gap between the cap body 204 and the rim 406.

Through deformation of the vessel interface seal 402, the vessel 102 may be sealed to the cap body 204. For example, a seal between the vessel 102 and the cap body 204 may substantially prevent liquids and gasses from escaping through the gap between the cap body 204 and the rim 406. In addition, the deformation of the vessel interface seal 402 may provide a seal between the rim 406 and the cap body 204 despite damage to the rim 406 and/or the vessel interface seal 402. For example, the deformation of the vessel interface seal 402 may substantially fill irregular depressions or volumes included in damaged portions of the rim 406.

Figure 5:
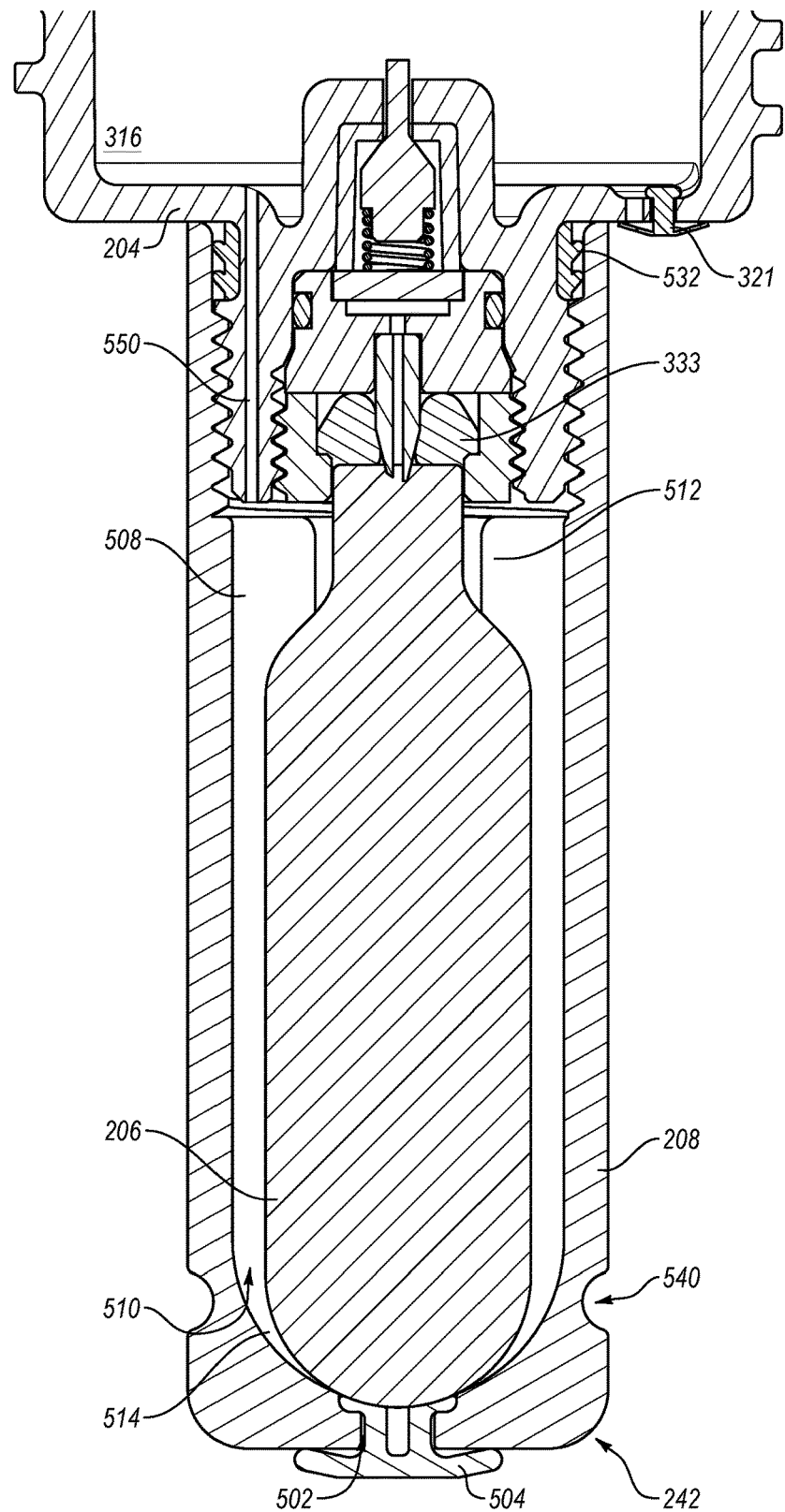
FIG. 5 illustrates an example embodiment of the gas reservoir sleeve that may be implemented in the beverage dispenser of FIGS. 1A-1C.

FIG. 5 illustrates an example embodiment of the gas reservoir sleeve 208 that may be implemented in the dispenser 100 of FIGS. 1A-1C. The gas reservoir sleeve 208 of FIG. 5 may include a vent port 502 that is defined in the second end 242. A sleeve lower plug 504 may be retained in the vent port 502. The sleeve lower plug 504 is configured to blow out in response to an overpressure of a particular pressure in the gas reservoir sleeve 208.

The overpressure may be caused by the failure of the compressed gas reservoir 206 or the pressure reservoir seal 333 that may involve a gas release that is too rapid to be safely relieved by the other relief mechanisms. Once the sleeve lower plug 504 is blown out, the gas reservoir sleeve 208 may quickly relieve the pressure to an internal volume of a vessel, for instance.

The gas reservoir sleeve 208 may also include sleeve vents 508 defined in an internal wall 510 of the gas reservoir sleeve 208. The sleeve vent 508 extends from a first volume 512 defined by the gas reservoir sleeve 208 that surrounds an exit of the compressed gas reservoir 206 to a second volume 514 defined by the gas reservoir sleeve 208 that is fluidly coupled to the vent port 502. The sleeve vents 508 may be sized to adequately channel escaping gas from a point of failure, which is most likely near an exit of the top of the compressed gas reservoir 206 to the vent port 502.

In some embodiments, the gas reservoir sleeve 208 may include cartridge sleeve wiper seals 532. The wiper seals 532 block liquid (e.g., the beverage 104 of FIG. 1B) from entering the gas reservoir sleeve 208. When liquids are drawn into the gas reservoir sleeve 208, it may cause unwanted buildup on sealing surfaces, corrosion of the compressed gas reservoir 206, and blockage of the components of the cap body 204. Because the compressed gas reservoir 206 cools as gas is released, the wiper seals 532 can create a positive seal to stop drawing in the liquid or liquid saturated gas into the gas reservoir sleeve 208.

In the depicted embodiment, the gas reservoir sleeve 208 may include a bag interface 540. The bag interface may include radial impressions around the gas reservoir sleeve 208 meant to allow for attachment of a bag or similar device to suspend materials (herbs, fruit, nuts, wood, etc.) into the beverage to make custom infusions.

In some embodiments, the cap body 204 may define a sleeve vent channel 550. The sleeve vent channel 550 may extend between the first volume 512 of the gas reservoir sleeve 208 and the low pressure cavity 316. The second volume 514 may be fluidly coupled to the first volume by the sleeve vent 508. Accordingly, a pressure in the gas reservoir sleeve 208 may be substantially equal to a pressure in the low pressure cavity 316.

The sleeve vent channel 550 may be a safety feature that vents an overpressure condition in the first volume 512 or the second volume 514 to the low pressure cavity 316, which may be further vented to the ambient pressure cavity 314, for instance. For example, if the compressed gas reservoir 206 slowly leaks into the first volume 512, the sleeve vent channel 550 may substantially prevents a build-up of pressure in the first volume 512 by venting some of the leaked gas to the low pressure cavity 316.

Figure 6:
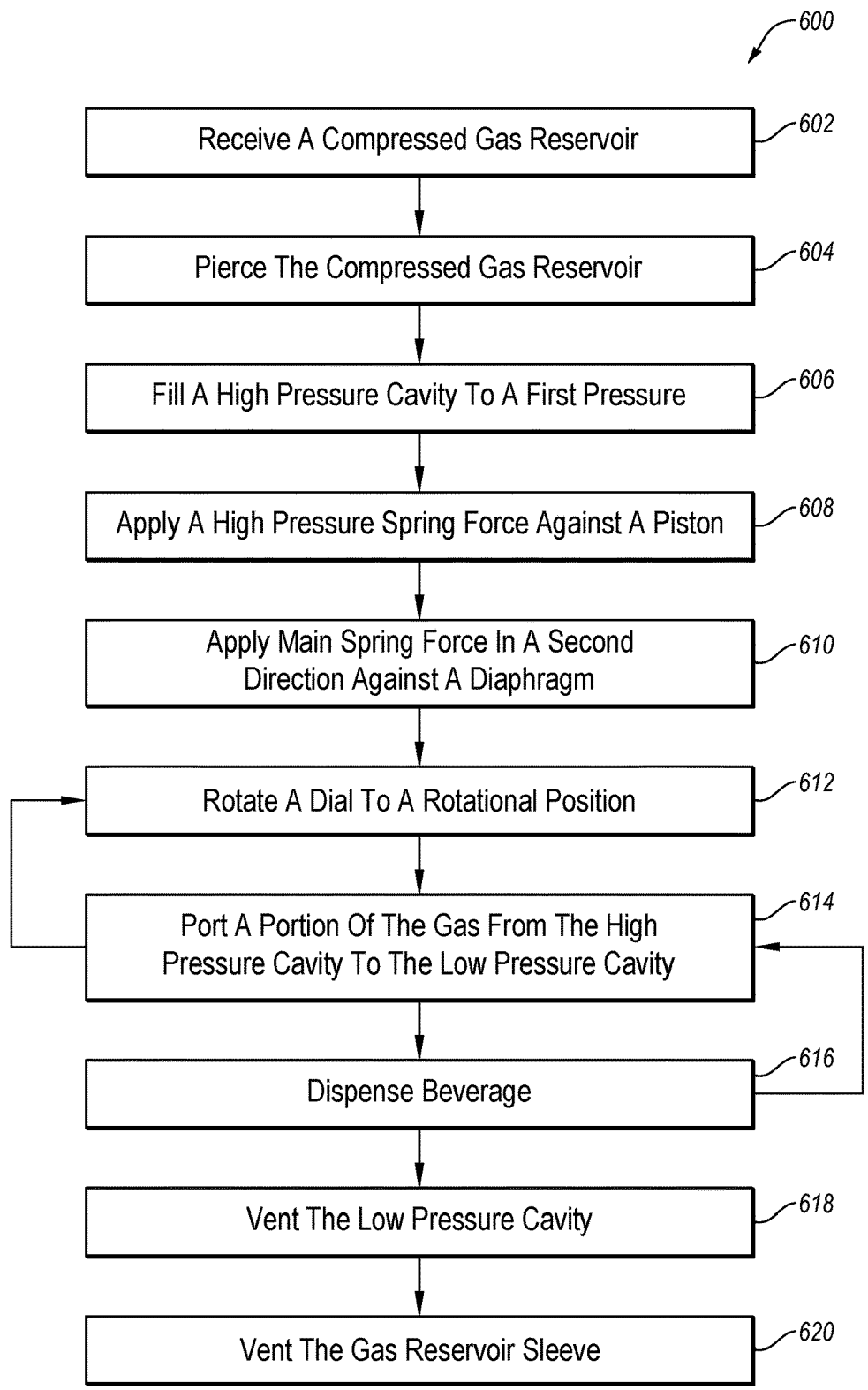
FIG. 6 is a flow chart of a method of regulating a pressure applied by a regulator cap assembly to an internal volume defined by a vessel, all in accordance with at least one embodiment described herein.

FIG. 6 is a flow chart of a method 600 of regulating a pressure. In some embodiments, the method 600 may include regulation of a pressure applied by a regulator cap assembly to an internal volume defined by a vessel. For example, the method 600 may be performed by the regulator cap assembly 200 of FIGS. 1A-1C. The regulator cap assembly 200 can regulate a pressure applied to the internal volume 106 of the vessel 102 using the method 600. Although illustrated as discrete blocks, various blocks may be divided into additional blocks, combined into fewer blocks, or eliminated, depending on the desired implementation.

The method 600 may begin at block 602 in which a compressed gas reservoir may be received. The compressed gas reservoir may be received into a lower portion of a cap body of the regulator cap assembly. At block 604, the compressed gas reservoir may be pierced. For example, the compressed gas reservoir may be pierced such that gas contained in the compressed gas reservoir flows from the compressed gas reservoir to a high pressure cavity.

At block 606, the high pressure cavity may be filled. For example, the high pressure cavity may be filled to a first pressure with the gas expelled from a compressed gas reservoir. The high pressure cavity is at least partially defined by a cap body of the regulator cap assembly. At block 608, a high pressure spring force may be applied against a piston. The high pressure spring force may be applied in a first direction to seat the piston against a piston seat. When the piston is seated, the piston substantially prevents the gas in the high pressure cavity from entering a low pressure cavity.

At block 610, main spring force may be applied in a second direction against a diaphragm. The diaphragm is positioned between an ambient pressure cavity and the low pressure cavity. Additionally, the diaphragm includes a piston translation portion that is configured to translate the piston relative to the piston seat in the second direction that is substantially opposite the first direction.

At block 612, a dial may be rotated to a rotational position. The rotational position is related to a particular distance between a spring hat and the diaphragm. At block 614, a portion of the gas may be ported from the high pressure cavity to the low pressure cavity. The gas may be ported until a low pressure develops. The low pressure may exert a force against a low pressure surface of the diaphragm that is sufficient to compress a main spring between the spring hat and the diaphragm to move the diaphragm in the first direction to seat the piston against the piston seat. The low pressure cavity is configured to be in fluid communication with the internal volume.

The method 600 may proceed to block 612 where the dial may be rotated to another rotational position, which is related to another particular distance between the spring hat and the diaphragm. In response to the dial being rotated to another rotational portion, the method 600 may proceed to block 614. Again, at block 614, another portion of the gas may be ported from the high pressure cavity to the low pressure cavity until another low pressure develops against the low pressure surface of the diaphragm that is sufficient to compress the main spring between the spring hat and the diaphragm to move the diaphragm in the first direction to seat the piston against the piston seat.

At block 616, a fluid such as a beverage in the internal volume may be dispensed. In response to a decrease in an amount of a fluid contained in the internal volume, the method 600 may proceed to block 614. At block 614, another portion of the gas may be ported from the high pressure cavity to the low pressure cavity until the low pressure redevelops against a low pressure surface of the diaphragm.

At block 618, the low pressure cavity may be vented. For example, the low pressure cavity may be vented via an overpressure vent channel defined in an internal surface of a side wall of the cap body that extends from the ambient pressure cavity to a distance defined relative to a maximum travel distance of the diaphragm. The low pressure cavity may be vented in response to an overpressure condition existing in the low pressure cavity.

At block 620, the gas reservoir sleeve may be vented. The gas reservoir sleeve may be vented via a vent port defined in a second end of the gas reservoir sleeve and a cartridge sleeve vent defined in an internal vertical wall of the gas reservoir sleeve that extends from a first volume defined by the gas reservoir sleeve that surrounds an exit of a pressurized gas reservoir to a second volume defined by the gas reservoir sleeve that is fluidly coupled to the vent port. The gas reservoir sleeve may be vented in response to an overpressure condition existing in a gas reservoir sleeve.

Additionally or alternatively, a volume defined by the gas reservoir sleeve may be vented to a low pressure cavity. In some embodiments, the gas reservoir sleeve may be vented via a sleeve vent channel defined in the cap body. The sleeve vent channel may substantially equalize pressures in the low pressure cavity and in the volume defined by the gas reservoir sleeve.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of regulating a pressure applied by a regulator cap assembly to an internal volume defined by a vessel, the method comprising:
    filling a high pressure cavity to a first pressure with a gas expelled from a compressed gas reservoir, wherein the high pressure cavity is at least partially defined by a cap body of the regulator cap assembly;
    applying, from a high pressure spring, a high pressure spring force against a piston in a first direction to seat the piston against a piston seat, wherein when the piston is seated, the piston substantially prevents the gas in the high pressure cavity from entering a low pressure cavity;
    applying, from a main spring, a main spring force in a second direction against a floating diaphragm, wherein the floating diaphragm is positioned between an ambient pressure cavity and the low pressure cavity and wherein the floating diaphragm includes a piston translation portion that is configured to translate the piston relative to the piston seat in the second direction that is substantially opposite the first direction as the floating diaphragm moves in the second direction;
    rotating a dial to a first rotational position, the first rotational position being related to a particular distance between a spring hat and the diaphragm; and
    porting a portion of the gas from the high pressure cavity to the low pressure cavity until a low pressure develops against a low pressure surface of the floating diaphragm that is sufficient to compress the main spring between the spring hat and the floating diaphragm to move the floating diaphragm in the first direction to seat the piston against the piston seat,
    wherein the low pressure cavity is configured to be in fluid communication with the internal volume.

2. The method of claim 1, further comprising in response to a decrease in an amount of a fluid contained in the internal volume, porting another portion of the gas from the high pressure cavity to the low pressure cavity until the low pressure redevelops against the low pressure surface of the floating diaphragm.

3. The method of claim 1, further comprising:
    receiving a compressed gas reservoir into a lower portion of the cap body of the regulator cap assembly; and
    piercing the compressed gas reservoir such that gas contained in the compressed gas reservoir flows from the compressed gas reservoir to the high pressure cavity.

4. The method of claim 1, further comprising:
    rotating the dial to another rotational position that is related to another particular distance between the spring hat and the diaphragm; and
    porting another portion of the gas from the high pressure cavity to the low pressure cavity until another low pressure develops against the low pressure surface of the floating diaphragm that is sufficient to compress the main spring between the spring hat and the diaphragm to move the diaphragm in the first direction to seat the piston against the piston seat.

5. A method of regulating a pressure applied by a regulator cap assembly to an internal volume defined by a vessel, the method comprising:

filling a high pressure cavity to a first pressure with a gas expelled from a compressed gas reservoir, wherein the high pressure cavity is at least partially defined by a cap body of the regulator cap assembly;

applying, from a high pressure spring, a high pressure spring force against a piston in a first direction to seat the piston against a piston seat, wherein when the piston is seated, the piston substantially prevents the gas in the high pressure cavity from entering a low pressure cavity;

applying, from a main spring, a main spring force in a second direction against a diaphragm, wherein the diaphragm is positioned between an ambient pressure cavity and the low pressure cavity and wherein the diaphragm includes a piston translation portion that is configured to translate the piston relative to the piston seat in the second direction that is substantially opposite the first direction;

rotating a dial to a first rotational position, the first rotational position being related to a particular distance between a spring hat and the diaphragm; and porting a portion of the gas from the high pressure cavity to the low pressure cavity until a low pressure develops against a low pressure surface of the diaphragm that is sufficient to compress the main spring between the spring hat and the diaphragm to move the diaphragm in the first direction to seat the piston against the piston seat, wherein the low pressure cavity is configured to be in fluid communication with the internal volume; and in response to an overpressure condition existing in the low pressure cavity, venting the low pressure cavity via an overpressure vent channel defined in an internal surface of a side wall of the cap body that extends from the ambient pressure cavity to a distance defined relative to a maximum travel distance of the diaphragm; and venting a volume defined by a gas reservoir sleeve to the low pressure cavity via a sleeve vent channel defined in the cap body.

6. A method of regulating a pressure applied by a regulator cap assembly to an internal volume defined by a vessel, the method comprising:

filling a high pressure cavity to a first pressure with a gas expelled from a compressed gas reservoir, wherein the high pressure cavity is at least partially defined by a cap body of the regulator cap assembly;

applying, from a high pressure spring, a high pressure spring force against a piston in a first direction to seat the piston against a piston seat, wherein when the piston is seated, the piston substantially prevents the gas in the high pressure cavity from entering a low pressure cavity;

applying, from a main spring, a main spring force in a second direction against a diaphragm, wherein the diaphragm is positioned between an ambient pressure cavity and the low pressure cavity and wherein the diaphragm includes a piston translation portion that is configured to translate the piston relative to the piston seat in the second direction that is substantially opposite the first direction;

rotating a dial to a first rotational position, the first rotational position being related to a particular distance between a spring hat and the diaphragm; and porting a portion of the gas from the high pressure cavity to the low pressure cavity until a low pressure develops against a low pressure surface of the diaphragm that is sufficient to compress the main spring between the spring hat and the diaphragm to move the diaphragm in the first direction to seat the piston against the piston seat, wherein the low pressure cavity is configured to be in fluid communication with the internal volume; and further comprising in response to an overpressure condition existing in a gas reservoir sleeve, venting the gas reservoir sleeve via a vent port defined in a second end of the gas reservoir sleeve and a cartridge sleeve vent defined in an internal vertical wall of the gas reservoir sleeve that extends from a first volume defined by the gas reservoir sleeve that surrounds an exit of a pressurized gas reservoir to a second volume defined by the gas reservoir sleeve that is fluidly coupled to the vent port.

* * * * *

UNITED STATES PATENT AND TRADEMARK OFFICE
CERTIFICATE OF CORRECTION

| | | |
|---|---|---|
| PATENT NO. | : 10,106,394 B2 | Page 1 of 1 |
| APPLICATION NO. | : 15/149437 | |
| DATED | : October 23, 2018 | |
| INVENTOR(S) | : Evan Christopher Rege et al. | |

It is certified that error appears in the above-identified patent and that said Letters Patent is hereby corrected as shown below:

On the Title Page

Item (54) and in the Specification, Column 1, Lines 1-2:
"METHOD OF REGULATING PRESSURE IN PRESSURIZED BEVERAGE DISPENSER"
Should read:
--METHOD OF REGULATING PRESSURE IN A PRESSURIZED BEVERAGE DISPENSER--.

At "(71) Applicant":
"GrowlerWerks, INC."
Should read:
--GrowlerWerks, Inc.--.

At "(72) Inventors":
"Brian Edwards Sonnichsen"
Should read:
--Brian Edward Sonnichsen--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*